(12) United States Patent
Yamamura et al.

(10) Patent No.: US 8,189,253 B2
(45) Date of Patent: May 29, 2012

(54) SHUTTER DEVICE AND DRIVE METHOD

(75) Inventors: Akihiko Yamamura, Osaka (JP);
Mamoru Nomoto, Osaka (JP); Shinya Sannohe, Osaka (JP)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 11/995,192

(22) PCT Filed: Jul. 27, 2006

(86) PCT No.: PCT/JP2006/314912
§ 371 (c)(1),
(2), (4) Date: Feb. 4, 2009

(87) PCT Pub. No.: WO2007/013564
PCT Pub. Date: Feb. 1, 2007

(65) Prior Publication Data
US 2009/0251757 A1 Oct. 8, 2009

(30) Foreign Application Priority Data
Jul. 29, 2005 (JP) .................. 2005-220143

(51) Int. Cl.
*G02B 26/02* (2006.01)

(52) U.S. Cl. ..................................... 359/232

(58) Field of Classification Search .................. 359/233, 359/234–236; 396/235, 246, 355, 357, 449, 396/452–453, 461, 483–490, 493, 498
See application file for complete search history.

(56) References Cited

U.S. PATENT DOCUMENTS
2004/0218246 A1* 11/2004 Onuki et al. .................. 359/234

FOREIGN PATENT DOCUMENTS

| JP | 4-229844 | 8/1992 |
| JP | 2001-174910 | 6/2001 |
| JP | 2004-170730 | 6/2004 |
| JP | 2004-354860 | 12/2004 |

* cited by examiner

*Primary Examiner* — Jennifer L. Doak

(57) ABSTRACT

The present invention provides a shutter apparatus and a drive method for the same, the shutter apparatus having functions of both a shutter apparatus for an image interception and a shutter apparatus for an aperture adjustment and being space-saving and low in costs. Within an illumination casing are provided first and second shading plates 212 and 215, first and second cammed gear 224 and 227 having a cam groove 225 and 228 respectively for driving the first shading plate 212 and the second shading plate 215 respectively. A cam shape is structured such that the rotation of a DC motor 235 (one drive source) enables the first and second shading plates 212 and 215 to drive independently. Thus, arbitrarily operating the functions of both the shutter apparatus for the image interception and the shutter apparatus for the aperture adjustment by the DC motor 235 (one shared drive source) is possible.

19 Claims, 19 Drawing Sheets

204

204

204

204

204

SHUTTER DEVICE AND DRIVE METHOD

TECHNICAL FIELD

The present invention relates to a shutter apparatus and a method for the same, the shutter apparatus being used for a projection display apparatus for both an image interception and an aperture adjustment, the projection display apparatus enlarging and projecting, using a projection lens, an optical image which is formed mainly on a light bulb, on a screen outside the apparatus.

BACKGROUND ART

A conventional shutter apparatus for the image interception is disclosed, for example, in Patent Document 1. FIG. 18 shows a perspective view illustrating a structure of the conventional shutter apparatus for the image interception.

Conventionally, a shutter apparatus 101 used for a projection display apparatus for the image interception uses a DMD (Digital Micromirror Device: registered trademark) or a liquid crystal display (LCD) panel as a light bulb. Also, the shutter apparatus 101 is used for the projection display apparatus that projects on a screen using a projection lens and is equipped to prevent a light leak in an image mute state. Furthermore, the shutter apparatus 101 is composed of a rotary driving device 102, a shading plate 103 and position detecting sensors 104 and 105. Here, the rotary driving device 102 includes a DC motor, the shading plate 103 is mounted on an output shaft of the rotary driving device 102 and the position detecting sensors 104 and 105 detect the position of the shading plate 103.

Next, the operation (movement) of the shutter apparatus 101 is described. When an image mute is instructed, the rotary driving device 102 rotates the shading plate 103 in an arrow V direction. Then the position detecting sensor 104 detects that the shading plate 103 has moved to the position that completely intercepts an optical path between the light bulb and the projection lens. Then the rotary driving device 102 is stopped.

On the other hand, when the image mute state is released, the rotary driving device 102 rotates the shading plate 103 in an arrow W direction. Then the position detecting sensor 105 detects that the shading plate 103 has moved to the position that is completely away from the optical path between the light bulb and the projection lens. Then the rotary driving device 102 is stopped.

Also, FIG. 19 shows a perspective view illustrating a structure of a conventional shutter apparatus for the aperture adjustment.

Conventionally, the shutter apparatus 111 used for the projection display apparatus for the aperture adjustment uses the DMD and liquid crystal display panel as the light bulb. Also, the shutter apparatus 111 is used for the projection display apparatus that projects on the screen using the projection lens. Furthermore, the shutter apparatus 111 is composed of a shading plate 112, a rotary driving device 113 and position detecting sensors 114 and 115. Here, the shading plate 112 is provided within an illumination optical device in order to enhance a contrast ratio of the image. The rotary driving device 113 includes the DC motor that drives the shading plate 112. The position detecting sensors 114 and 115 detect the position of the rotary driving device 113.

Next, the operation of the shutter apparatus 111 is described. When a high contrast state is instructed, the rotary driving device 113 rotates the shading plate 112 in an arrow X direction. Then the position detecting sensor 114 detects that the shading plate 112 has moved to the position that intercepts a particular part of the optical path within the illumination optical device. Then the rotary driving device 113 is stopped.

On the other hand, when the high contrast state is released, the rotary driving device 113 rotates the shading plate 112 in an arrow Y direction. Then the position detecting sensor 115 detects that the shading plate 112 has moved to the position that is completely away from the optical path within the illumination optical device. Then the rotary driving device 113 is stopped.

Patent Document 1: Laid-Open Patent Publication No. 2001-174910

DISCLOSURE OF THE INVENTION

Problems to be Solved

However, according to the conventional shutter apparatus, the shading plate 103 of the shutter apparatus for the image interception is usually provided somewhere in the optical path between the light bulb and the projection lens. The shading plate 112 of the shutter apparatus for the aperture adjustment is provided somewhere in the optical path (between a light source and the glass bulb).

Consequently, in the case of providing both the shutter apparatus for the image interception and the shutter apparatus for the aperture adjustment, each shutter apparatus needs separate shading plates, separate drive source and separate drive means such as the DC motor and the like, separate position detecting sensors and separate driving circuit. Thus, a large space is needed for the shutter apparatuses, which results in prevention of downsizing and lightening the weight of the shutter apparatus. Other problems are an increase in the number of parts and an increase in cost.

Also, it is possible to provide the shutter apparatus for the image interception in the optical path within the illumination optical device, like the shutter apparatus for the aperture adjustment. However, in that case, it is necessary for the shading plate 103 to completely intercept the optical path. Therefore, the size of the shading plate 103 needs to be equal to or larger than the size of the diameter of the optical path. Therefore, a large space is needed on the right and left of, above and below, and in front of and behind the illumination optical device in order to move the shading plate 103 to the position that is completely away from the position that completely intercepts the optical path, which results in the prevention of downsizing.

The present invention, which solves the conventional problems, has an object to provide a shutter apparatus and a drive method for the same, the shutter apparatus having functions of both a shutter apparatus for the image interception and a shutter apparatus for the aperture adjustment and being also space-saving and low in cost.

Means to Solve Problems

In order to solve the conventional problems, the shutter apparatus of the present invention is a shutter apparatus for intercepting an optical path, the shutter apparatus comprising a plurality of shading plates each being pivotally supported by a corresponding one of a plurality of rotationally moving shafts so as to be capable of moving rotationally, an extending direction of the rotationally moving shafts being substantially orthogonal to the optical path, one drive source and a power transmission mechanism that transmits driving force of the drive source to each of the shading plates such that each of the shading plates rotationally moves in different operation modes between a first stop position where each shading plate intercepts the optical path the most and a second stop position where each shading plate intercepts the optical path the least, wherein the optical path is substantially completely intercepted when all of the plurality of the shading plates are in the first stop position. Also, the drive method of the present invention is a drive method for a shutter apparatus for intercepting an optical path, the shutter apparatus transmitting a driving force from one drive source by a power transmission mechanism so as to rotationally move a plurality of shading plates between a first stop position where the shading plates intercept the optical path the most and a second stop position where the shading plates intercept the optical path the least, the shading plates being pivotally supported by a plurality of rotationally moving shafts so as to be capable of rotationally moving, an extending direction of the rotationally moving shafts being substantially orthogonal to the optical path, wherein the power transmission mechanism rotationally moves the plurality of the shading plates in different operation modes.

According to this structure, it is possible for one drive source to drive a plurality of shading plates in each operation mode. Thus, the number of drive sources, for example, can be reduced, compared to the case of having two shutter apparatuses (one for the image interception and the other for the aperture adjustment). Thus, it is possible to reduce the cost of the drive source and to make the shutter apparatus compact by effectively making use of the space unnecessary for the drive source.

Also, according to the shutter apparatus of the present invention, a radius of rotational movement of each shading plate is smaller than a diameter of the optical path.

Here, "the radius of the rotational movement of each shading plate" is a distance, on the shading plate, from the rotationally moving shaft to a position farthest from the rotationally moving shaft in the direction that is orthogonal to the extending direction of the rotationally moving shaft.

According to this structure, since the radius of the rotational movement of each shading plate is smaller than the diameter of the optical path, it is possible to make small the size of the shading plate in the optical path direction (storage space for the shading plate) when the shading plate rotationally moves to the second stop position, for example, compared to the conventional shading plate whose radius of the rotational movement is larger than the diameter of the optical path. Thus, it is possible to make the shutter apparatus compact.

Furthermore, according to the shutter apparatus and the drive method of the present invention, each of the plurality of the shading plates includes one of a pin and a guide, and the power transmission mechanism includes (i) one of a guide and a pin that engages with the one of the pin and the guide respectively of each shading plate and (ii) one or a plurality of movable bodies that reciprocate by the driving force of the drive source, and transmits the driving force by a change in an engaging position with the shading plates, the change being caused by reciprocating motion of the movable bodies.

Here, "one of a guide and a pin that engages with the one of the pin and the guide respectively of each shading plate" is the notion that includes the case where the guide or pin engages with the pin or guide of the shading plate directly or indirectly.

According to this structure, the connection of the shading plate with the power transmission mechanism can be performed by a point-contact of the pin with the guide. Therefore, arranging only the shading plates within the illumination optical device, for example, makes it hard for heat from the shading plate to reach outside the illumination optical device.

As a result, it is possible to reduce the temperature rise in the drive transmission mechanism and the drive source outside the illumination optical device. Thus, materials low in heat-resistance, for example, can be used as the drive source and parts which compose the drive transmission mechanism. As a result, it is possible to lower cost.

Also, according to the shutter apparatus and the drive method of the present invention, a number of the plurality of the shading plates is two, and a surface area of each shading plate is substantially equal to a surface area of a cross sectional surface area divided in two of the optical path.

According to this structure, it is possible to arrange two shading plates within the illumination optical device, saving space.

Effects of the Invention

As mentioned above, according to the shutter apparatus and the drive method of the present invention, it is possible to rotationally move a plurality of the shading plates in different operation modes using one drive source and to arbitrarily operate a plurality of functions that accompany movements of each shading plates. As a result, it is possible to compose the shutter apparatus that is highly space-saving, is low in the number of parts and has a plurality of functions, making it possible to downsize and lower cost.

DESCRIPTION OF REFERENCES

Figure 1:
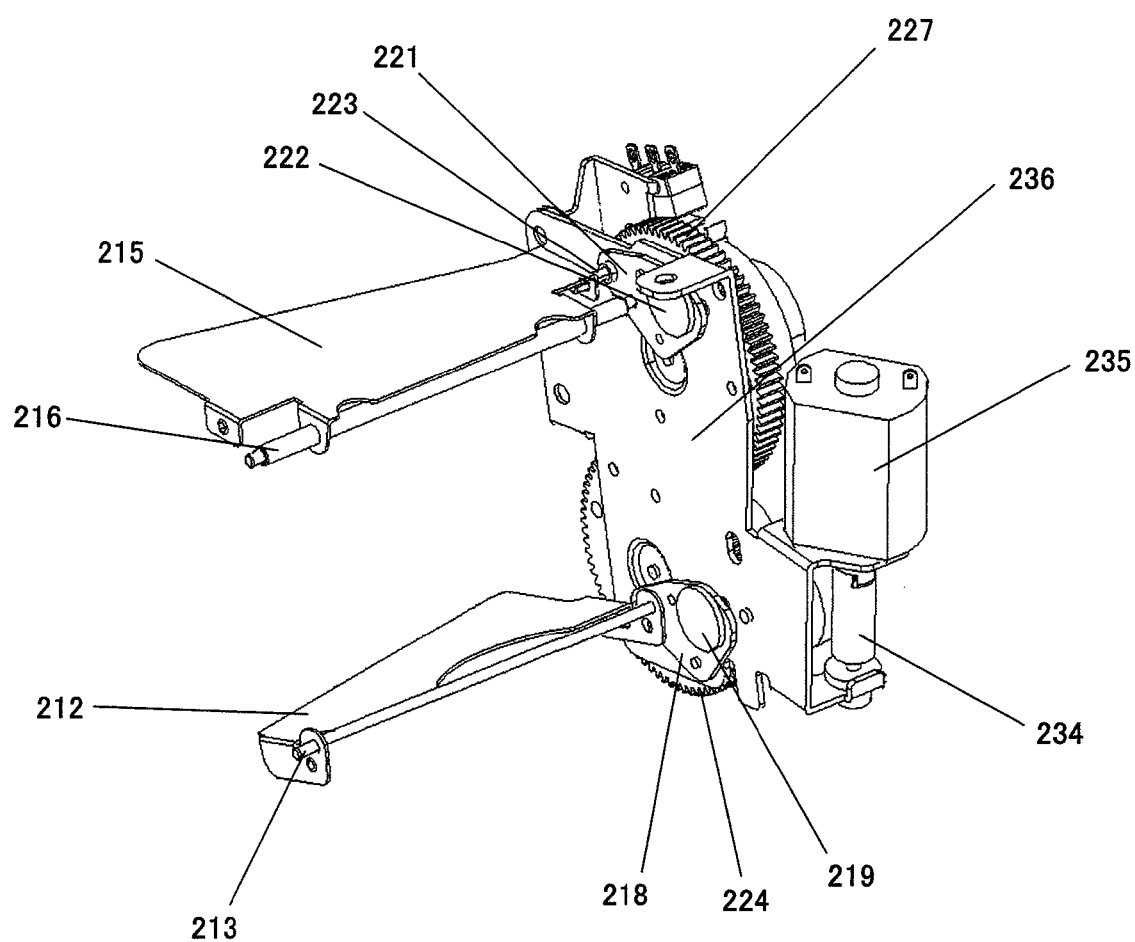
FIG. 1 is a perspective view (in the usual usage state) illustrating a structure of a shutter apparatus in the first embodiment of the present invention.

201 DMD
202 projection lens
203 illumination optical device
204 shutter apparatus
205 arc tube
206 concave mirror
207 color wheel
208 group of lenses
209 reflecting mirror
210 first lens array
211 second lens array
212 first shading plate
213 first rotationally moving pivot
214 long groove
215 second shading plate
216 second rotationally moving pivot
217 long groove
218 first drive lever
219 first drive lever pivot
220 drive pin
221 second drive lever
222 second drive lever pivot
223 drive pin
224 first cammed gear
225 cam groove
226 cam pin
227 second cammed gear
228 cam groove
229 cam pin
230 first cammed gear pivot
231 second cammed gear pivot
232 worm wheel pivot
233 worm wheel
234 worm gear
235 DC motor
236 drive base
237 position detecting sensor
238 position detecting sensor
239 position detecting sensor
245 illumination case
301 first shading plate
302 central part
303 second shading plate
304 central part
305 shutter apparatus
401 rack
402 connecting member
403 connecting member
404 connecting member
405 first guide member
406 second guide member
407 first guide groove
408 second guide groove
409 output shaft
410 pinion
411 detecting projection part
412 detecting projection part
413 detecting projection part

BEST MODE FOR CARRYING OUT THE INVENTION

The best mode for carrying out the invention is described in the following with reference to the drawings.

First Embodiment

Figure 2:
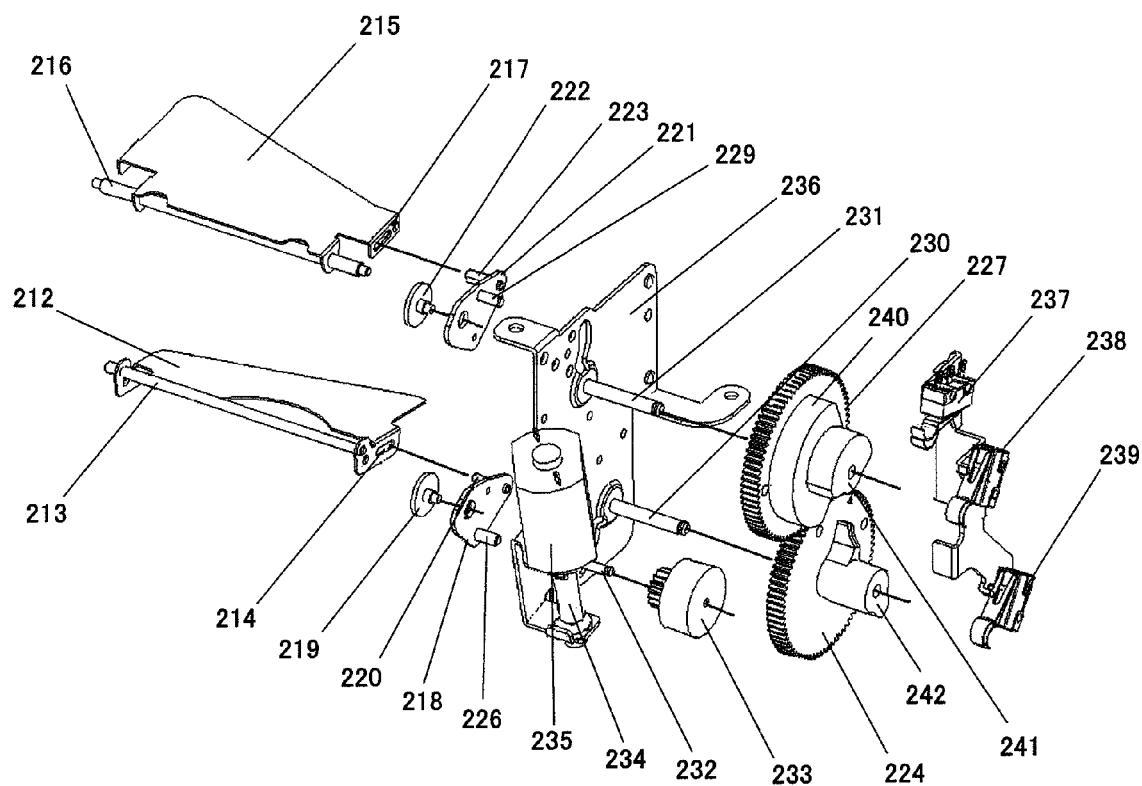
FIG. 2 is an exploded view of the shutter apparatus of the first embodiment of the present invention.
Figure 3:
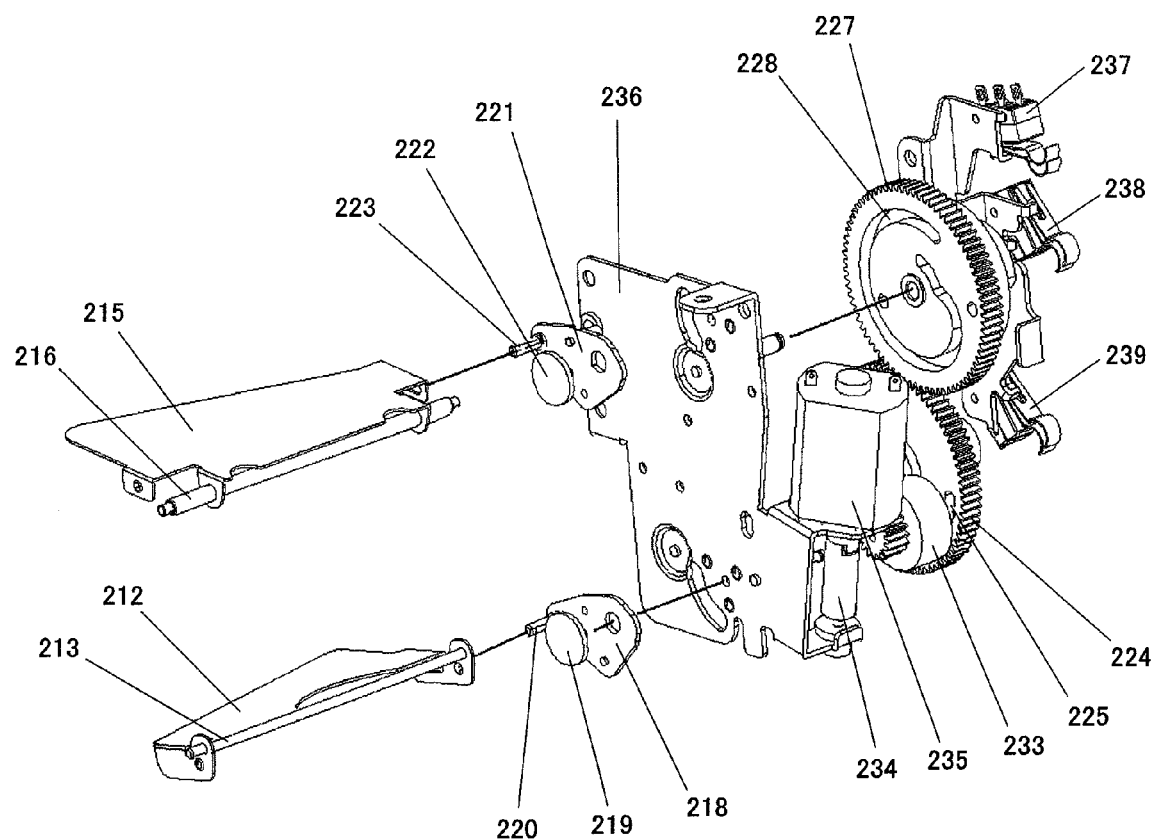
FIG. 3 is an exploded view of the shutter apparatus of the first embodiment of the present invention.
Figure 4:
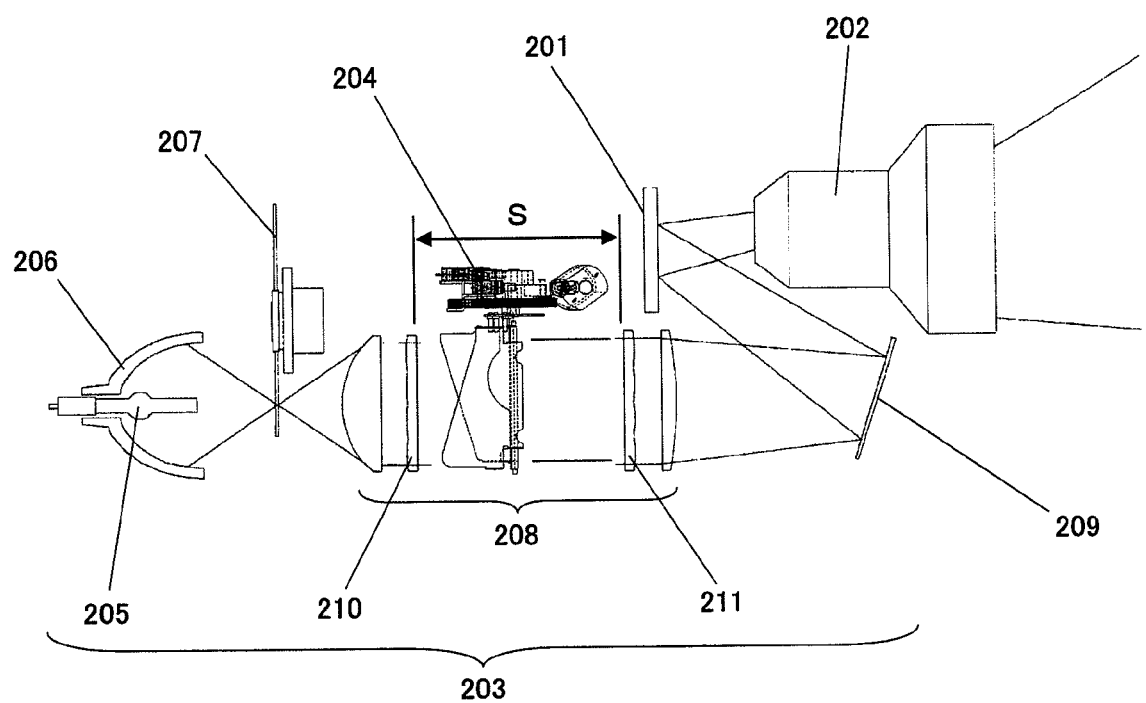
FIG. 4 is side view showing a sketch of an optical system of the projection display apparatus including the shutter apparatus of the first embodiment of the present invention.
Figure 5:
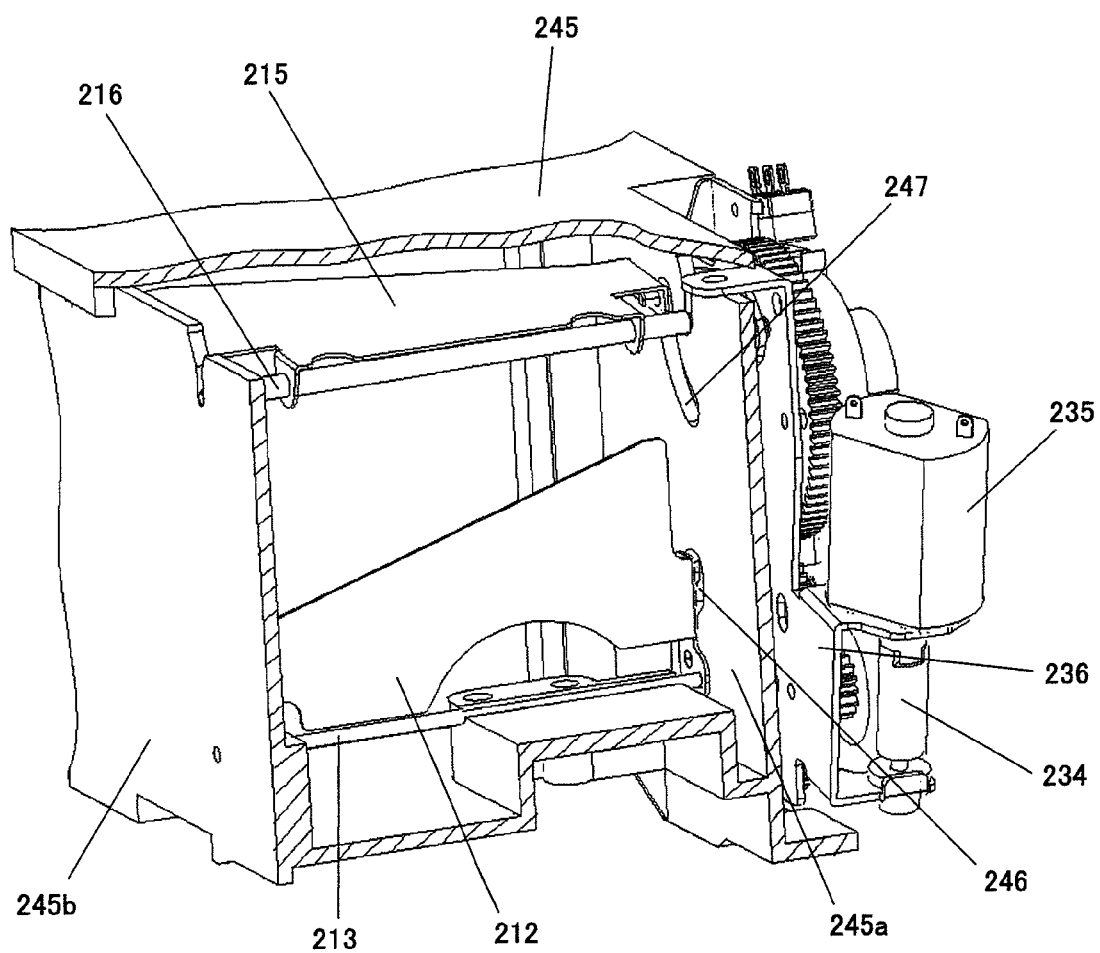
FIG. 5 is a perspective view showing a sketch of the shutter apparatus of the first embodiment of the present invention.
Figure 6:
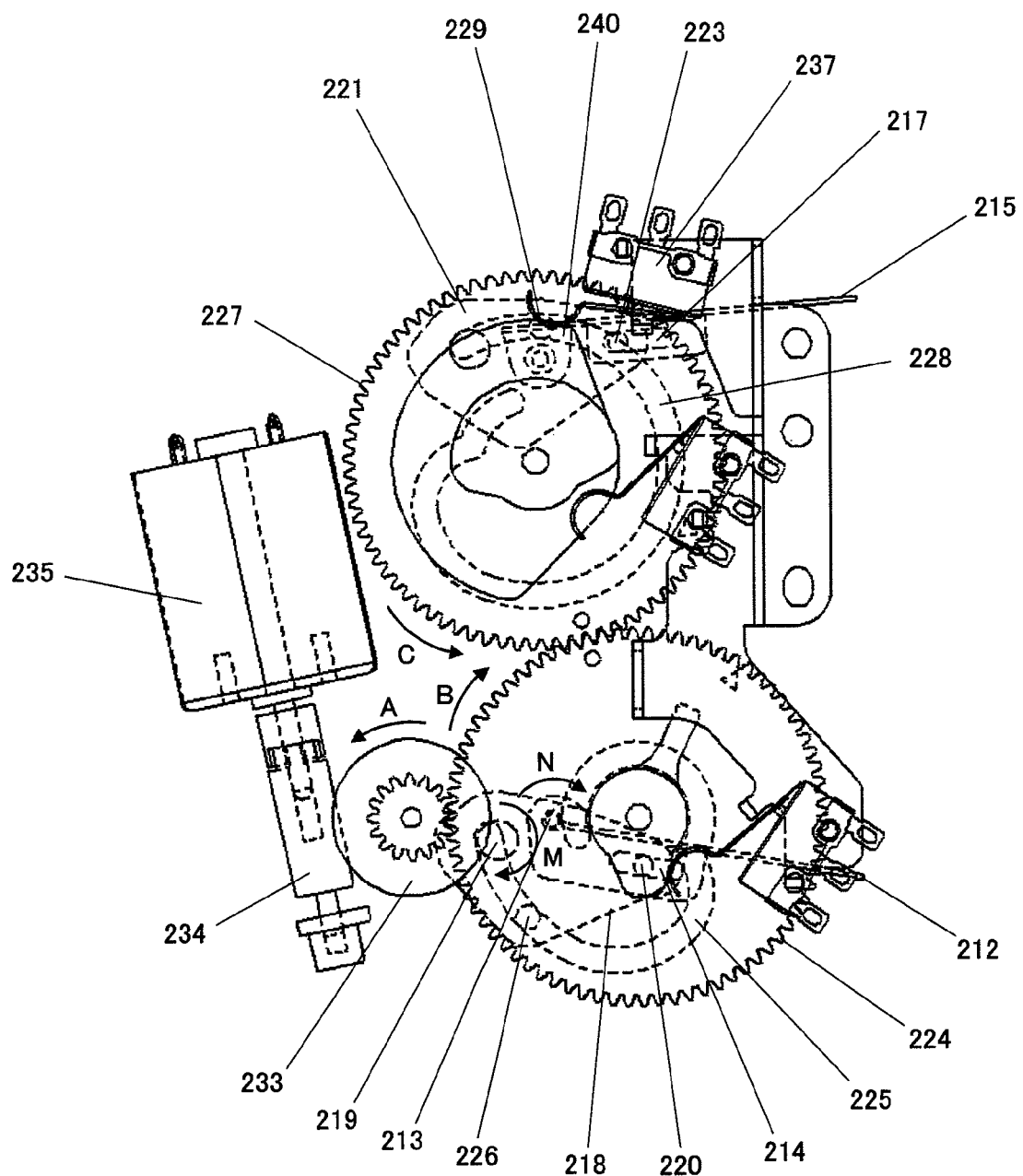
FIG. 6 is an operational explanatory view of the shutter apparatus of the first embodiment of the present invention.
Figure 7:
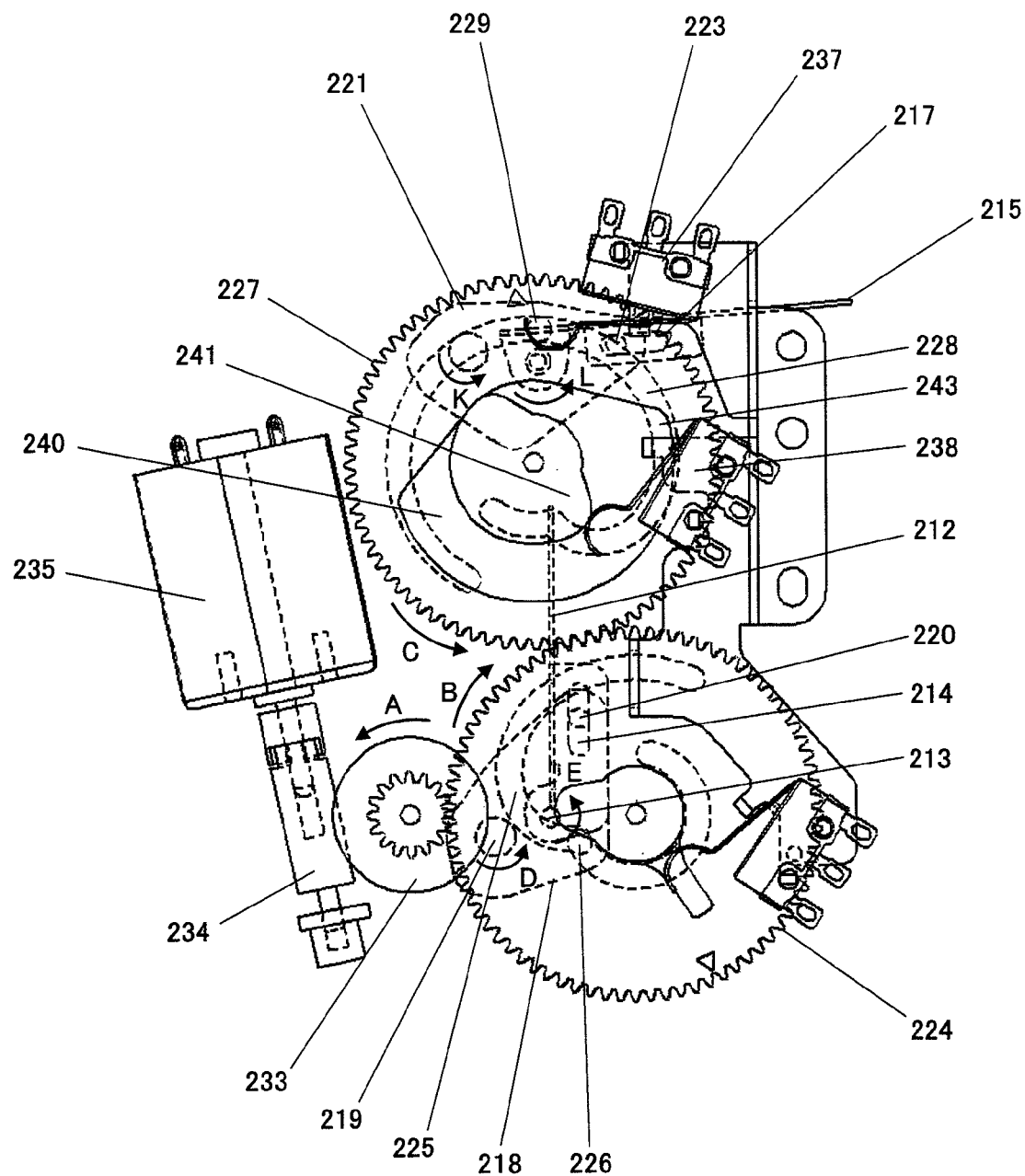
FIG. 7 is an operational explanatory view of the shutter apparatus of the first embodiment of the present invention.
Figure 8:
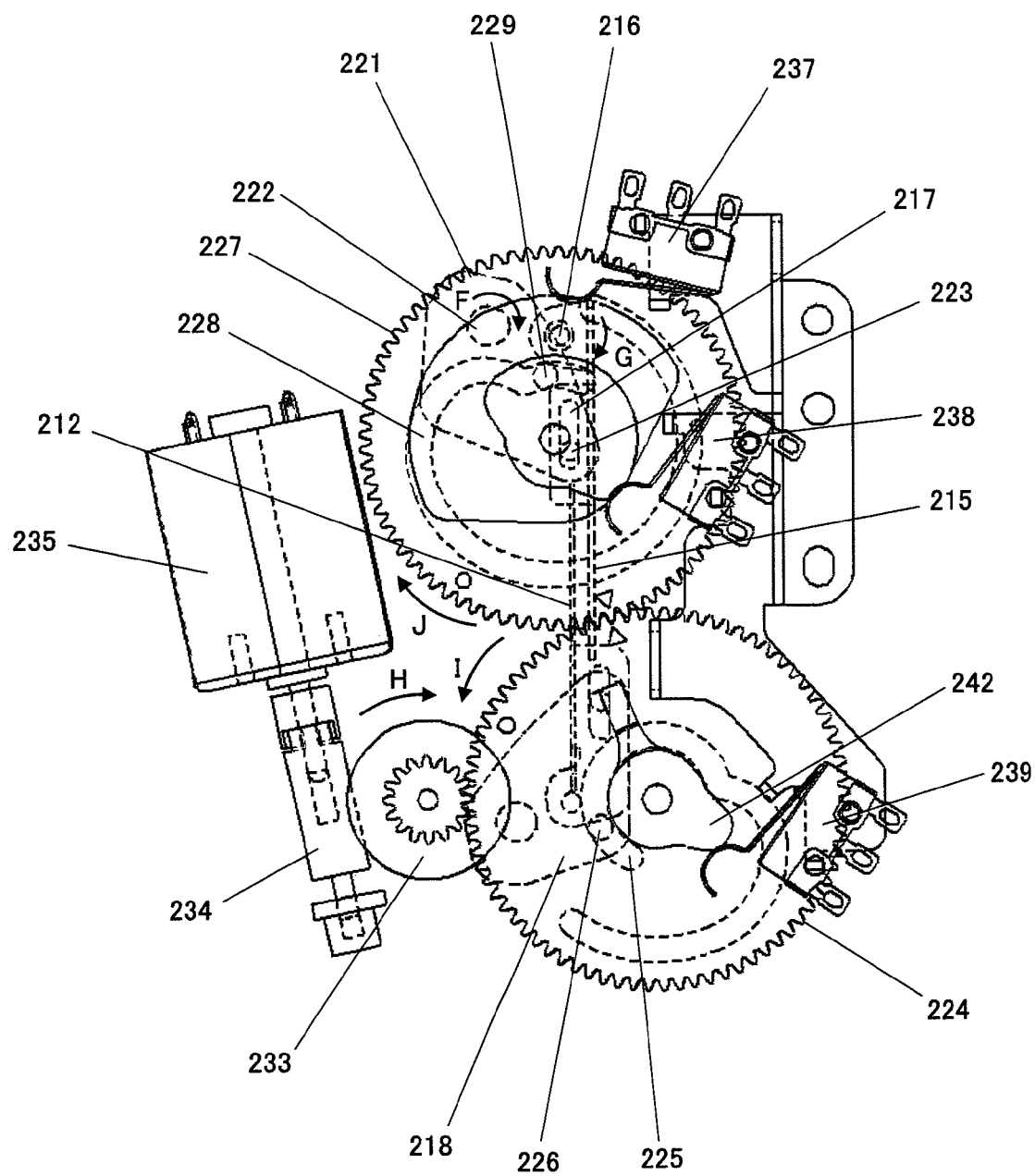
FIG. 8 is an operational explanatory view of the shutter apparatus of the first embodiment of the present invention.
Figure 9:
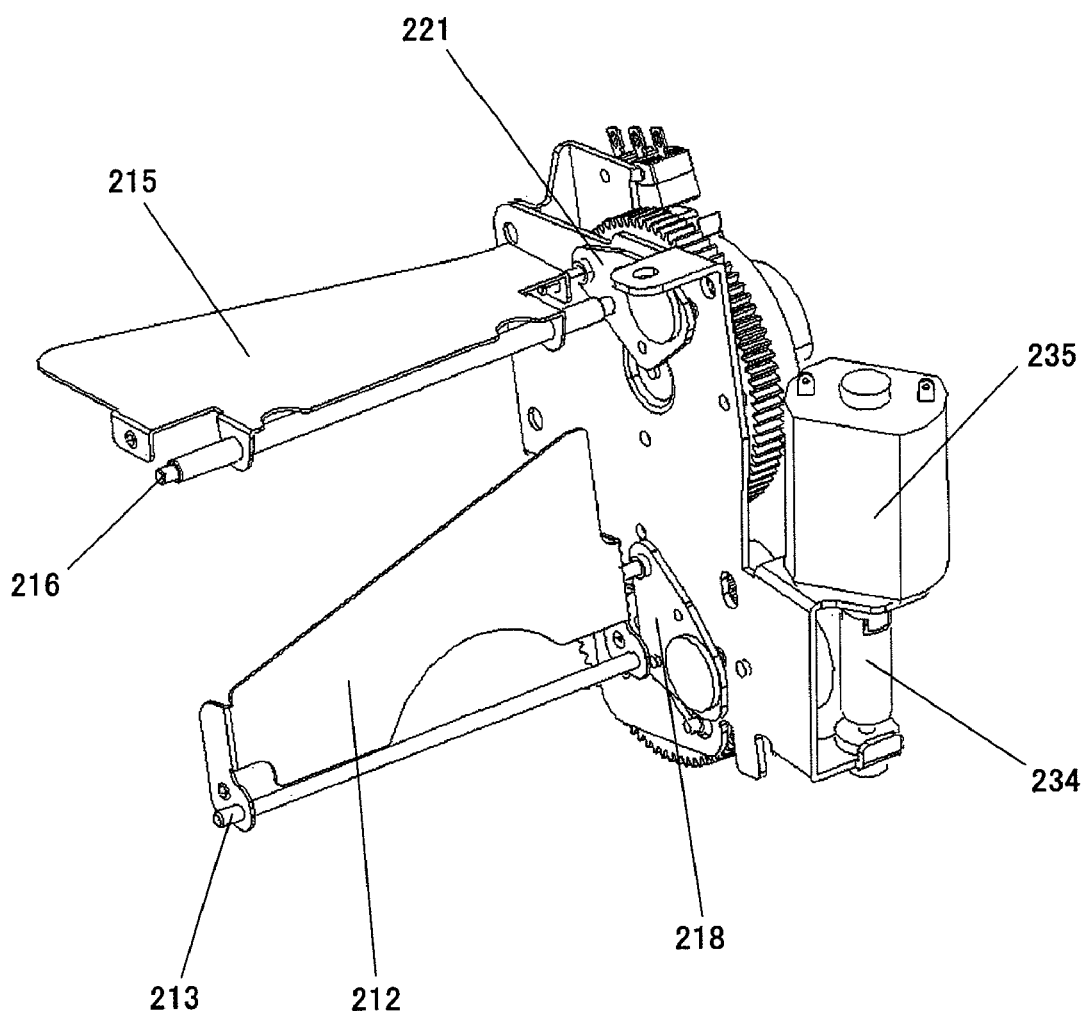
FIG. 9 is a perspective view illustrating a structure of the shutter apparatus of the first embodiment of the present invention in a high contrast state.
Figure 10:
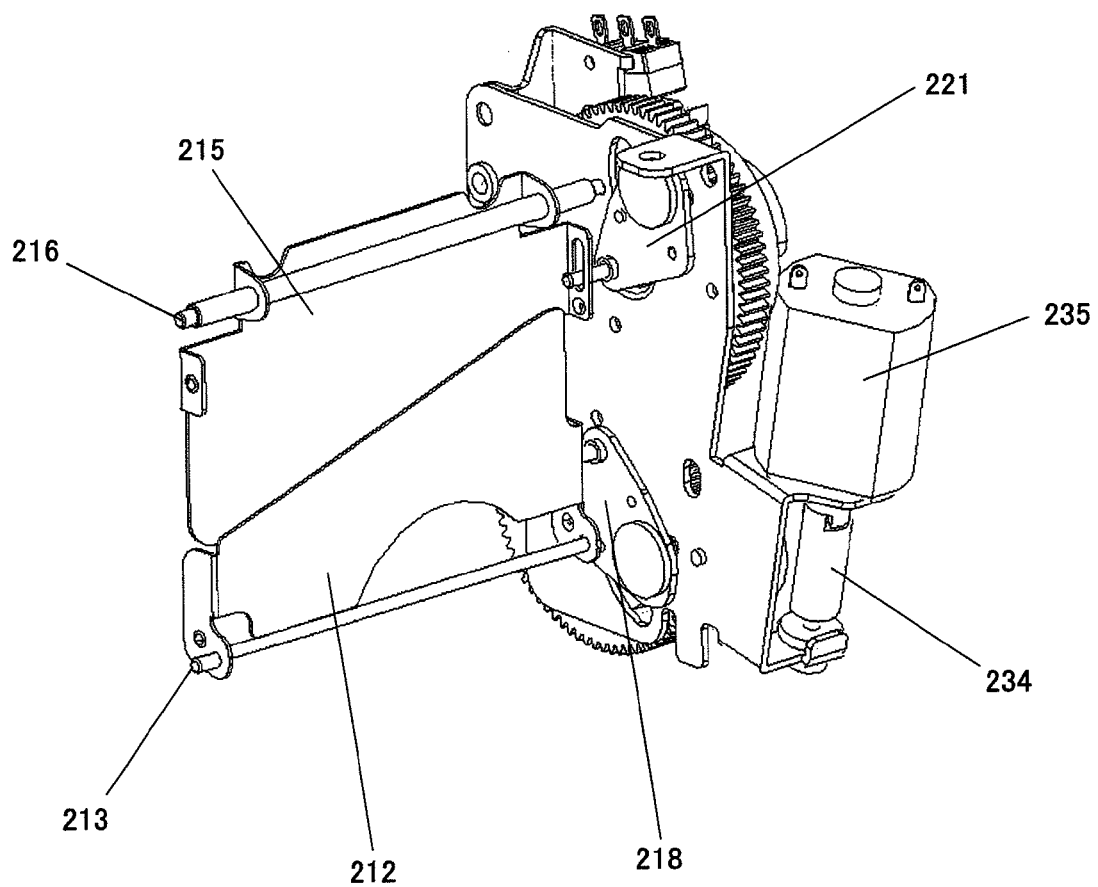
FIG. 10 is a perspective view illustrating a structure of the shutter apparatus of the first embodiment of the present invention in an image mute state.

FIG. 1 to FIG. 4 illustrate a shutter apparatus of the first embodiment of the present invention. FIG. 1 is a perspective view (in usual usage state) illustrating a structure of the same shutter apparatus. FIGS. 2 and 3 are exploded views of the same shutter apparatus. FIG. 4 is a side view showing a sketch of an optical system of a projection display apparatus including the same shutter apparatus. FIG. 5 is a perspective view showing a sketch of the shutter apparatus of the first embodiment of the present invention. FIGS. 6 to 8 are operational explanatory views of the shutter apparatus. FIG. 9 is a perspective view illustrating a structure of the same shutter apparatus in the high contrast state. FIG. 10 is a perspective view illustrating a structure of the same shutter apparatus in the image mute state.

1. Projection Display Apparatus

In FIG. 4, a projection display apparatus is composed of a DMD (Digital Micromirror Device) 201, a projection lens 202, an illumination optical device 203 and a shutter apparatus 204. Here, the DMD 201 is used as a light bulb capable of performing an optical modulation on each pixel. The projection lens 202 enlarges and projects only light, which is reflected in a predetermined direction by the DMD 201, on a screen outside the apparatus. The illumination optical device 203 radiates light from the predetermined direction to the DMD 201. The shutter apparatus 204 is provided within the illumination optical device 203.

The illumination optical device 203 is composed of an arc tube 205, a concave mirror 206, a color wheel 207, a plurality of groups of lenses 208 and a reflecting mirror 209. Here, the arc tube 205 emits white light. The concave mirror 206 reflects light emitted from the arc tube 205 in a predetermined direction and focuses the resulting light. The plurality of groups of the lenses radiate once focused and color separated light to the DMD 201.

The color wheel 207 is rotationally driven and is composed of color filters, each of the color filters transmitting light such as red (hereinafter, "R") light, green (hereinafter, "G") light and blue (hereinafter, "B") light respectively. Also, the color wheel 207 performs, in accordance with time, color separation on the transmitted light into R-light, G-light and B-light.

The shutter apparatus 204 is arranged, as shown in FIG. 4, between a first lens array 210 and a second lens array 211 that compose the plurality of groups of lenses 208 and is capable of arbitrarily shading the optical path therebetween.

2. Shutter Apparatus

Next, a detailed structure of the shutter apparatus 204 is described using FIGS. 1 to 3 and FIG. 5.

A first shading plate 212 is mounted on a first rotationally moving pivot 213 so as to be capable of moving rotationally and has a long groove 214 at one end in the direction where the first rotationally moving pivot 213 extends. A second shading plate 215 is mounted on a second rotationally moving pivot 216 so as to be capable of rotationally moving and has a long groove 217 at one end in the direction where the second rotationally moving pivot 216 extends.

The first drive lever 218 is supported by a first drive lever pivot 219 so as to be capable of rotationally moving and includes a drive pin 220 that engages with the long groove 214 of the first shading plate 212. A second drive lever 221 is supported by a second drive lever pivot 222 so as to be capable of rotationally moving and includes a drive pin 223 that engages with the long groove 217 of the second shading plate 215.

Also, a first drive lever 218 has a cam pin (corresponding to "pin" in the present invention) 226 that engages with a cam groove (corresponding to "guide groove" in the present invention) 225 of a first cammed gear (corresponding to "movable body" and "gear" in the present invention) 224. A second drive lever 221 has a cam pin (corresponding to "pin" in the present invention) 229 that engages with a cam groove (corresponding to "guide groove" in the present invention) 228 of a second cammed gear (corresponding to "movable body" and "gear" in the present invention) 227.

The first cammed gear 224 is pivotally supported by the first cammed gear pivot 230 at the central opening of the first cammed gear 224 so as to be capable of rotationally moving. The second cammed gear 227 is pivotally supported by the second cammed gear pivot 231 at the central opening of the second cammed gear 227 so as to be capable of rotationally moving.

Here, the first and second drive lever pivots 219 and 222 and the first and second cammed gear pivots 230 and 231 are mounted on a drive base 236.

The second cammed gear 227 engages with the first cammed gear 224. Also, the first cammed gear 224 engages with a worm wheel 233 at its spur gear part. Here, the worm wheel 233 is pivotally supported by a worm wheel pivot 232 so as to be capable of rotationally moving. The worm wheel 233 engages with a worm gear 234 at its spur gear part. The worm gear 234 (i) is fixed to an output shaft of a DC motor 235 which is a drive source and (ii) transmits the rotation of the DC motor 235 to the worm wheel 233, reducing the speed of the rotation of the DC motor 235.

A series of drive systems ("power transmission systems" in the present invention) that transmit the driving force from the DC motor 235 (drive source) to the first drive lever 218 (the first shading plate 212) and the second drive lever 221 (the second shading plate 215) are arranged on the drive base 236.

Also, position detecting sensors 237, 238 and 239 are provided on the drive base 236. The rotation of the first cammed gear 224 and the second cammed gear 227 cause convex parts 240, 241, 242 and 243 that are provided on each cammed gear to press the position detecting sensors 237, 238 and 239, which enables the rotation of the DC motor 235 to stop at the arbitrary rotationally moving positions of the cammed gears.

"The arbitrary positions of rotational movement" here are the first stop position where the first shading plate 212 and the second shading plate 215 intercept the optical path the most, and the second stop position where the first shading plate 212 and the second shading plate 215 intercept the optical path the least. Also, when the first and second shading plates 212 and 215 are in the first stop position, the shutter apparatus is in the image mute state that substantially completely intercepts the optical path. When the first and second shading plates 212 and 215 are in the second stop position, the shutter apparatus is in the usual usage position. Also, the shutter apparatus is in the high contrast state when the first shading plate 212 and the second shading plate 215 are in the first stop position and the second stop position respectively.

The first shading plate 212 and the second shading plate 215 are provided within an illumination case 245 by fastening the first rotationally moving pivot 213 and second rotationally moving pivot 216, as shown in FIG. 5, on the side of walls 245a and 245b of the illumination case 245 housing the illumination optical device 203.

On the other hand, the drive base 236 is provided outside the illumination case 245. Also the drive base 236 engages with the long groove 214 of the first shading plate 212 and the long groove 217 of the second shading plate 215 by inserting drive pins 220 and 223 into carved grooves 246 and 247 provided on the side of the wall 245a of the illumination case 245. Also, the carved grooves 246 and 247 are arc-shaped so as to fit the rotational movement of the first drive lever 218 and second drive lever 221.

The first shading plate 212 and second shading plate 215 are made using, for example, metal material such as a radiant aluminum alloy plate and the like that are high in reflectivity, as material. Also, the illumination case 245 is made of resin material that is high in heat resistance and separates, from the drive base 236, the high heat generated in the optical path within the illumination optical device 203 by surrounding walls such as the side of walls (245a and 245b) of the illumination case 245 and the like.

The operation of the shutter apparatus 204 structured like the above is described in the following.

3. Operation (1) Projection Display Apparatus

A basic operation of the projection display apparatus is described briefly. The white light emitted from the arc tube 205 is reflected by the concave mirror 206 so as to be focused on the surface of or in a vicinity of the color wheel 207. The color wheel 207 rotates at a constant speed to allow the R-light, G-light and B-light to transmit with a predetermined timing. The transmitted light is radiated to the DMD 201 by the plurality of groups of lenses 208 and the reflecting mirror 209. The radiated light synchronizes with the timing of the R-light, G-light and B-light to be radiated, and is modulated by the DMD 201 in accordance with input information.

The pixels to be displayed are displayed by controlling the angles of infinitesimal mirrors each corresponding to each one of the pixels to be in a predetermined direction, reflecting light in the direction that allows the light to be incident on the projection lens 202 and then projecting the light of the pixels to be displayed on a screen outside the apparatus (not illustrated). On the other hand, for the pixels not to be displayed, the light of the pixels are not projected on the screen outside the apparatus by controlling the angles of infinitesimal mirrors each corresponding to each one of the pixels to be in a predetermined direction and reflecting light in the direction that does not allow the light to be incident on the projection lens 202.

Performing these operations at high speed makes it possible to view a full color image on the screen due to the after-image effect of eyes.

(2) Shutter Device

The detail of the operation of the shutter apparatus 204 that is arranged somewhere in the optical path of the first lens array 210 and the second lens array 211 within the plurality of groups of lenses 208 within the illumination optical device 203 is described using FIG. 6 to FIG. 8.

a. Usual Usage State

The shutter apparatus in the usual usage state (the state that projects the image on the screen outside) is illustrated in FIG. 6. At this time, the first shading plate 212 and second shading plate 215 are in a state that is completely away from the optical path (i.e. in the second stop position).

Here, a drive pin 220 of the first drive lever 218 engages with the long groove 214 of the first shading plate 212. Also, the cam pin 226 of the first drive lever 218 is positioned in an outermost part of the cam groove 225 of the first cammed gear 224. Also, the first shading plate 212 is in the second stop position.

The drive pin 223 of the second drive lever 221 engages with the long groove 217 of the second shading plate 215. Also the cam pin 229 of the second drive lever 221 is positioned in the outermost part of the cam groove 228 of the second cammed gear 227 and the second shading plate 215 is in the second stop position.

The first cammed gear 224 and the second cammed gear 227 are phase-adjusted and assembled so as to engage with each other in this state shown in FIG. 6.

At this time, the convex part 240 on the second cammed gear 227 presses the position detecting sensor 237, which enables the position detecting sensor 237 to detect that the convex part 240 is in this present position shown in FIG. 6.

b. From Usual Usage State to High Contrast State

When the high contrast state is instructed while the shutter apparatus 204 is in the usual usage state, the DC motor 235 starts rotating. Then the rotation of the worm gear 234 causes the worm wheel 233, the first cammed gear 224 and the second cammed gear 227 to rotate in arrow A, B and C directions respectively.

Then, when the first cammed gear 224 and the second cammed gear 227 are brought into the state illustrated in FIG. 7, the convex part 241 on the second cammed gear 227 presses the position detecting sensor 238 and then the rotation of the DC motor 235 is stopped. Then the first shading plate 212 and the second shading plate 215 are brought into the first stop position and the second stop position respectively.

At this time, the cam pin 226 of the first drive lever 218 moves along the cam groove 225 of the first cammed gear 224 to the innermost part. Thus, the first drive lever 218 rotationally moves in an arrow D direction around the first drive lever pivot 219. Then the drive pin 220 that engages with the long groove 214 of the first shading plate 212 rotationally moves the first shading plate 212 in an arrow E direction (from second stop position to the first stop position) around the first rotationally moving pivot 213.

On the other hand, the second drive lever 221 does not move (the engaging position of the cam groove 228 with the cam pin 229 does not change) since the cam pin 229 remains in the position of the outermost part of the cam groove 228 of the second cammed gear 227, the outermost part being formed into a concentric circle shape. Accordingly, the second shading plate 215 stops, remaining in the state that is completely away from the optical path (remaining in the second stop position).

As a result, the first shading plate 212 is brought into the state that intercepts a predetermined part of the optical path within the illumination optical device 203 and then is brought into the high contrast state.

A perspective view of the shutter apparatus in this high contrast state is illustrated in FIG. 9.

c. From High Contrast State to Image Mute State

When the image mute is instructed while the shutter apparatus is in the high contrast state shown in FIG. 7 and FIG. 9, the DC motor starts rotating and the worm gear 234 rotates. As a result, the worm wheel 233, the first cammed gear 224 and the second cammed gear 227 rotate in the arrow A, B and C directions respectively.

Then, when the first cammed gear 224 and the second cammed gear 227 are brought into the state shown in FIG. 8, the convex part 242 on the first cammed gear 224 presses the position detecting sensor 239 and then the rotation of the DC motor 235 is stopped. Then the first shading plate 212 and the second shading plate 215 are brought into the first stop position.

At this time, the cam pin 226 of the first drive lever 218 does not move since the cam pin 226 remains in the position of the innermost part of the cam groove 225 of the second cammed gear 224, the innermost part being formed into a concentric circle shape. Accordingly, the first shading plate 212 also stops, remaining in the state that intercepts a predetermined part of the optical path (remaining in the second stop position).

On the other hand, since the cam pin 229 moves along the cam groove 228 of the second cammed gear 227 to the innermost part, the second drive lever 221 moves rotationally in an arrow F direction around the second drive lever pivot 222. Then the drive pin 223 that engages with the long groove 217 of the second shading plate 215 rotationally moves the second shading plate 215 in an arrow G direction (from the second stop position to the first stop position) around the second rotationally moving pivot 216.

As a result, the second shading plate 215 is brought into the state that intercepts the rest of the optical path other than the predetermined part of the optical path within the illumination optical device 203 and then is brought into the state that completely intercepts the image.

A perspective view of the shutter apparatus in this image mute state is shown in FIG. 10.

d. Image Mute Release (from Image Mute to High Contrast)

Next, when the image mute release is instructed while the shutter apparatus is in the image mute state shown in FIG. 8 and FIG. 10, the DC motor 235 starts rotating and the worm gear 234 rotates. As a result, the worm wheel 233, the first cammed gear 224 and the second cammed gear 227 rotate in arrow H, I and J directions respectively.

Then when the first cammed gear 224 and the second cammed gear 227 are brought into the state shown in FIG. 7, the convex part 243 on the second cammed gear 227 is brought into the state that does not press the position detecting sensor 237 with the convex part 241 on the second cammed gear 227 pressing the position detecting sensor 237. Then the rotation of the DC motor 235 is stopped and the first shading plate 212 and the second shading plate 215 are brought into the first stop position and the second stop position respectively.

At this time, the cam pin 229 moves along the cam groove 228 of the second cammed gear 227 to the outermost part. Thus, the second drive lever 221 rotationally moves in an arrow K direction around the second drive lever pivot 222, and the drive pin 223 that engages with the long groove 217 of the second shading plate 215 rotationally moves the second shading plate 215 in an arrow L direction (from the first stop position to the second stop position) around the second rotationally moving pivot 216.

On the other hand, the cam pin 226 of the first drive lever 218 does not move since the cam pin 226 remains in the position of the innermost part of the cam groove 225 of the first cammed gear 224, the innermost part being formed into a concentric circle shape. Accordingly, the first shading plate 212 also stops, remaining in the state that intercepts a predetermined part of the optical path (remaining in the first stop position).

As, a result, the second shading plate 215 is brought into the state that is completely away from the optical path and the first shading plate 212 is brought into the state that intercepts a predetermined part of the optical path within the illumination optical device 203. Then the shutter apparatus is brought into the high-contrast state shown in FIG. 9.

e. From High-Contrast State to Usual Usage State

Next, when a high contrast release (returning to the usual usage state) is instructed while the shutter apparatus is in the high contrast state shown in FIG. 7 and FIG. 9, the DC motor 235 starts rotating and the worm gear 234 rotates. As a result, the worm wheel 233, the first cammed gear 224 and the second cammed gear 227 rotate in the arrow H, I and J directions respectively.

Then, when the first cammed gear 224 and the second cammed gear 227 are brought into the state shown in FIG. 6, the convex part 240 on the second cammed gear 227 presses the position detecting sensor 237 and then the rotation of the DC motor 235 is stopped. Then the first shading plate 212 and the second shading plate 215 are brought into the second stop position.

At this time, the second drive lever 221 does not move since the cam pin 229 remains in the position of the outermost part of the cam groove 228 of the second cammed gear 227, the outermost part being formed into a concentric circle shape. Accordingly, the second shading plate 215 stops, remaining in the state that is completely away from the optical path (remaining in the second stop position).

On the other hand, the cam pin 226 of the first drive lever 218 moves along the cam groove 225 of the first cammed gear 224 to the outermost part. Thus, the first drive lever 218 rotationally moves in an arrow M direction around the first drive lever pivot 219. Then the drive pin 220 that engages with the long groove 214 of the first shading plate 212 rotationally moves the first shading plate 212 in an arrow N direction (from the first stop position to the second stop position) around the first rotary pivot 213.

As a result, the first shading plate 212 is brought into the state that is completely away from the optical path and the shutter apparatus is brought into the usual usage state shown in FIG. 1.

f. From Usual Usage State to Image Mute State

When the image mute is instructed while the shutter apparatus is in the usual usage state, the DC motor 235 starts rotating from the state shown in FIG. 1 and FIG. 6. The DC motor 235 continues to rotate in the high contrast state shown in FIG. 7 and FIG. 9 without stopping. Then when brought into the state shown in FIG. 8 and FIG. 10, the DC motor 235 stops rotating and is brought into the image mute state.

g. From Image Mute State to Usual Usage State

When the image mute release is instructed while the shutter apparatus is in this image mute state, on the other hand, the DC motor 235 starts rotating from the state shown in FIG. 8 and FIG. 10. The DC motor 235 continues to rotate in the high contrast state shown in FIG. 7 and FIG. 9 without stopping. Then when brought into the state shown in FIG. 1 and FIG. 6, the DC motor 235 stops rotating and is brought into the usual usage state.

4. Summary

As mentioned above, the cam-shaped cam grooves 225 and 228 are structured such that the rotation of the DC motor 235 (one drive source) enables the first shading plate 212 and the second shading plate 215 to drive in different operation modes (independently) by providing the first cammed gear 224 and the second cammed gear 227, the first cammed gear 224 having the cam groove 225 for driving the first shading plate 212 and the second cammed gear 227 having the cam groove 228 for driving the second shading plate 215.

Here, the first shading plate 212 is used as an aperture adjustment function that rotationally moves only when the second shading plate 215 is in the second stop position (this operation is called "aperture adjustment mode"). On the other hand, the second shading plate 215 is used as an image mute function that rotationally moves only when the first shading plate 212 is in the first stop position (this operation is called "mute mode"). Thus, the operation modes of the first shading plate 212 and the operation mode of the second shading plate 215 are different from each other.

Thus, the shapes of the cam grooves 225 and 228 of the first and second cammed gears 224 and 227 are formed so as to become in the operation modes set in advance by the rotational movement of the first shading plate 212 and the second shading plate 215. Therefore, it is possible to arbitrarily set the timing and the like that the first shading plate and the second shading plate are driven to rotationally move. Also, it is possible to acquire a plurality of functions (e.g. mute function and aperture adjustment function) that accompany the rotational movement of the plurality of the shading plates.

Also, since the first and second cammed gears 224 and 227 are driven by one drive source, it is possible to reduce the number of the drive source, for example, compared to the case of providing two shutter apparatuses each for the image mute and the aperture adjustment separately. Thus, it is possible to reduce the cost of the drive source and to make the shutter apparatus and the display device compact owing to the space for the unnecessary drive source.

Furthermore, since the second cammed gear 227 engages with the first cammed gear 224, the first or second cammed gears 224 and 227 are geared to each other. Thus, control of rotational movement of the second cammed gear 227 becomes easy, which makes it possible, for example, to reduce the number of position detecting sensors that detect the position of the first and second cammed gears 224 and 227.

Specifically, in providing two shutter apparatuses each for the image mute and for the aperture adjustment, four position detecting sensors are needed. However, in the first embodiment, the number of position detecting sensors is three, reducing one position detecting sensor. Naturally, as the number of sensors decreases, control of drive systems becomes easy and furthermore it is possible to reduce the number of control parts and the like, making it possible to lower cost.

Consequently, the shutter apparatus pertaining to the first embodiment is highly space-saving and capable of reducing the number of parts, attempting to downsize, lightening the weight of the shutter apparatus, lowering cost, and furthermore having two functions (image mute function and aperture adjustment function), compared to the case of providing two shutter apparatuses each for the image mute and for the aperture adjustment, and furthermore the case of having a structure of having one shading plate perform two functions.

Also, according to the first embodiment of the present invention, the shape of the first shading plate 212 and the second shading plate 215 are shapes having the surface areas of the optical path divided substantially in two. Therefore, a distance from the first rotationally moving pivot 213 to the end of the first shading plate 212 and a distance from the second rotationally moving pivot 216 to the second shading plate 215 can be substantially equally shortened, compared to the case where the surface area of the first shading plate 212 greatly differs form the surface area of the second shading plate 215.

Also, for example, by making the rotationally moving direction of the first shading plate 212 opposite to the rotationally moving direction of the second shading plate 215 (the shading plate in the usual usage state is positioned on the same side (light source side) relative to the rotationally moving pivots 213 and 216), the space for rotational movement for the first and second shading plates 212 and 215 can be smaller, compared to the case of intercepting the optical path by rotationally moving one piece of the shading plates, for example.

Thus, in providing the shutter apparatus 204 somewhere in the optical path within the illumination optical device 203 (e.g. between the first lens array 210 and the second lens array 211 within the plurality of groups of lenses 208), even though a distance S between the first lens array 210 and the second lens array 211 is short, it is possible to arrange the shutter device 204, which allows the display device and the like to be designed more freely, making it possible to downsize and lighten the weight of the shutter apparatus.

Also, the drive pin 220 that drives the first shading plate 212 engages with the long groove 214 of the first shading plate 212 by the point-contact of the pin (shaft) with the groove. Also, the drive pin 223 that drives the second shading plate 215 engages with the long groove 217 of the second shading plate 215 by the point-contact of the pin (shafts) with the groove. Also, the first and second shading plates 212 and 215 are arranged within the illumination case 245.

Thus, heat of the first shading plate 212 and the second shading plate 215 that becomes high in temperature due to the heat of the optical path within the illumination optical device 203 hardly is conducted to parts such as a set of drive systems and the position detecting sensors 237, 238 and 239 and the like that are relatively low in heat resistance. Here, the set of drive systems ranges from the drive base 236 provided outside the illumination optical device 203 and the DC motor 235 provided on the drive base 236 to the first drive lever 218 and the second drive lever 221. Thus, temperature rise in those parts can be avoided.

Furthermore, the first shading plate 212 and the second shading plate 215 are usually made using, as material, metal materials such as radiant aluminum alloy plate and the like that are high in reactivity. Thus, the first shading plate 212 and the second shading plate 215 hardly absorb the heat, preventing the temperature rise in connected parts. However, if the temperature rise in each part placed outside the illumination optical device (case) can be kept under the heat-resistant temperature by connecting the first shading plate 212 with the second shading plate 215 by the point contact of the pin with the groove, like the first embodiment of the present invention, it is not necessary to use special and expensive materials such as the radiant aluminum alloy and the like for the first shading plate 212 and the second shading plate 215, making it possible to reduce cost.

Also, according to the first embodiment of the present invention, the shutter apparatus 204 is arranged between the first array 210 and the second array 211 in the plurality of groups of lenses 208 within the illumination optical device 203. Also, the shutter apparatus 204 is used as a shutter apparatus for the image interception by completely intercepting the optical path by the first shading plate 212 and the second shading plate 215. Accordingly, since the shading plate of the conventional shutter apparatus for the image interception is usually provided somewhere in the optical path between a light bulb and the projection lens, the image projected on the screen is intercepted gradually from the edge of the screen, along with the operation that intercepts the optical path by the shading plate for the image interception.

On the other hand, according to the shutter apparatus 204 of the first embodiment of the present invention, since the shading plate is provided somewhere in the optical path of the plurality of groups of lenses 208 that radiates the once-focused and color separated light to the DMD 201, the whole image projected on the screen becomes darker evenly and gradually. Thus the shutter apparatus 204 is brought into the image mute state. As a result, in changing a mode from the usual usage state to the image mute state, or in returning the mode to the usual usage state from the image mute state, it is possible to acquire the high-quality operation state where the operation of the shading plate is inconspicuous.

Also, according to the first embodiment of the present invention, the first cammed gear 224 and the second cammed gear 227 are used as a method for driving the first shading plate 212 and the second shading plate 215 (drive transmission mechanism) by transmitting the driving force from the DC motor 235 (drive source). However, other than this, for example, a method of driving the first shading plate 212 and the second shading plate 215 by providing one cammed gear with two kinds of cam shaped cam grooves (drive transmission mechanism) is possible. In this case, since the drive transmission mechanism can be composed of only one cammed gear, there is a further effect of attempting to save space.

Also, in this case, in order to provide one cammed gear with two cam-shaped cam grooves, providing two cam-shaped grooves using both sides (back and front) of the cammed gear is possible. However, even if this is difficult in terms of design, it is possible to realize it by configuring the drive transmission mechanism as follows. Two kinds of cam-shaped cam grooves are provided on one side of one cammed gear. Then the first shading plate 212 is structured to be driven when the cammed gear, for example, moves rotationally in the clockwise direction from the usual usage state. Also, the second shading plate 215 is structured to be driven when the cammed gear moves rotationally in the counterclockwise direction. Then the cam grooves in areas where the shading plates are to be stopped are formed into concentric circle shapes.

Also, a rotationally moving means is not limited to a cammed gear as long as the rotationally moving means rotationally drives the first shading plate 212 and the second shading plate 215 individually. For example, a method of driving the first shading plate 212 and the second shading plate 215 independently by a straight-line motion mechanism such as a sliding plate or the like is possible (described in a third embodiment).

Second Embodiment

Figure 11:
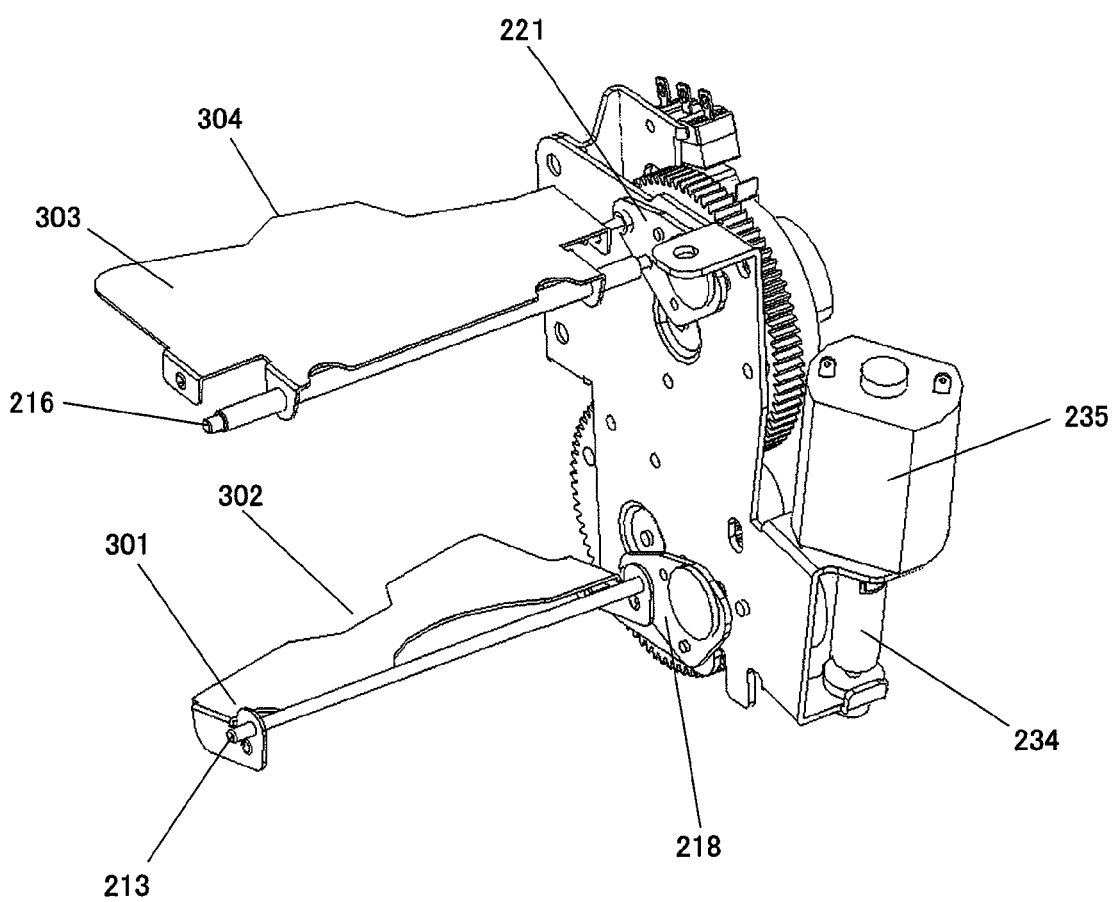
FIG. 11 is a perspective view illustrating a structure of the shutter apparatus of the second embodiment of the present invention in a usual used state.
Figure 12:
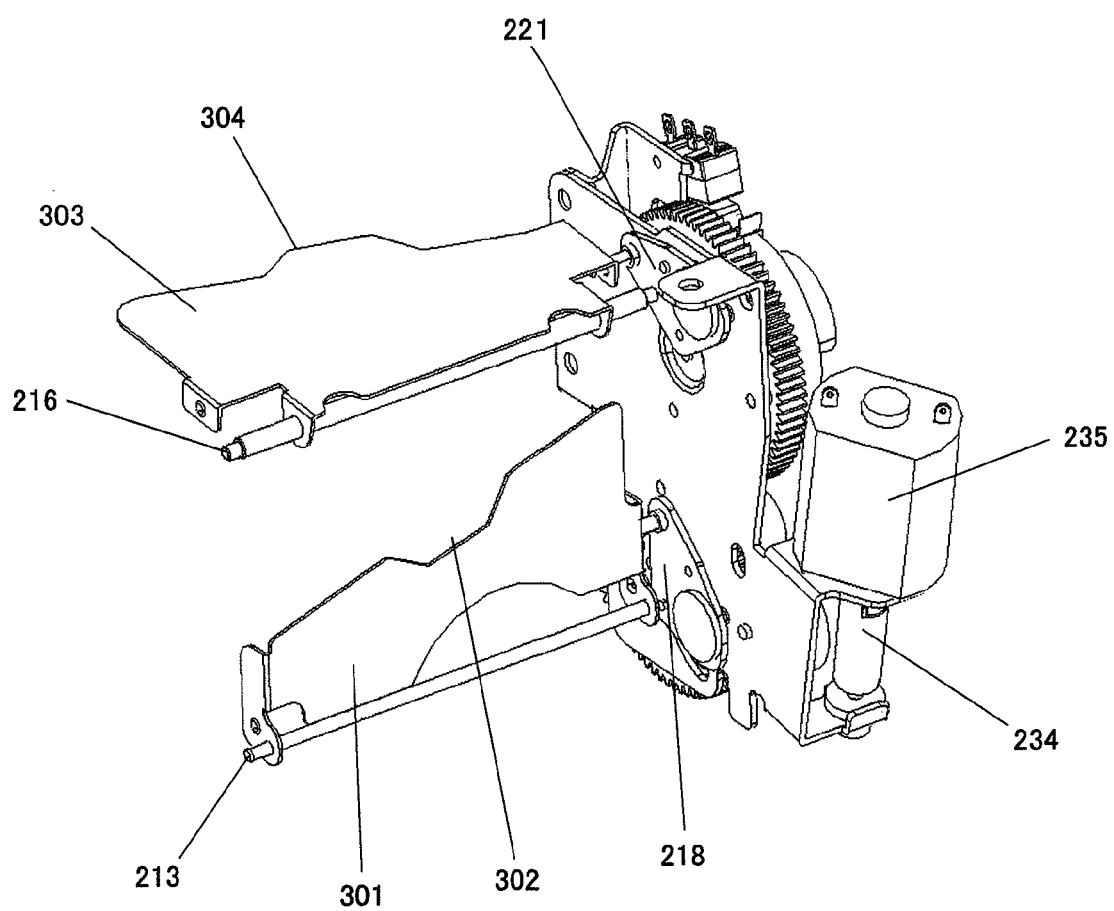
FIG. 12 is a perspective view illustrating a structure of the shutter apparatus of the second embodiment of the present invention in the high contrast state.
Figure 13:
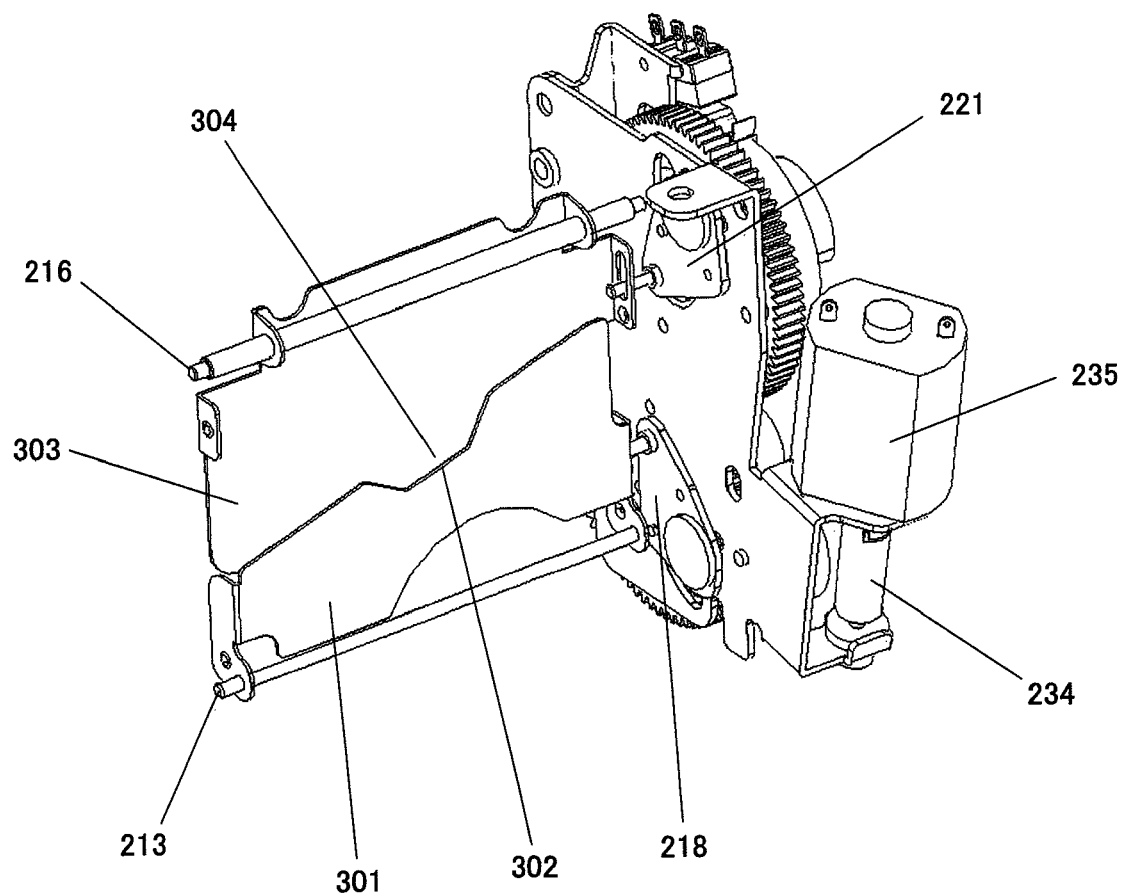
FIG. 13 is a perspective view illustrating a structure of the shutter apparatus of the second embodiment of the present invention in the image mute state.

FIG. 11 is a perspective view illustrating the structure of the shutter apparatus of the second embodiment of the present invention in the usual usage state. FIG. 12 is a perspective view illustrating the structure of the same shutter apparatus in the high contrast state. FIG. 13 is a perspective view illustrating the structure of the same shutter apparatus in the image mute state.

Through FIG. 11 to FIG. 13, same references are used for components which are the same as components in FIG. 1 to FIG. 10 and the description is omitted.

Through FIG. 11 to FIG. 13, a first shading plate 301, which is mounted on the first rotationally moving pivot 213 so as to be capable of moving rotationally, is formed into the shape that divides the optical path substantially in two. Although the shape of the first shading plate 301 is a kind of shape that intercepts a part of a particular position of the optical path, the surface area that intercepts the optical path is slightly reduced only in the central part 302. Also, the second shading plate 303, which is mounted on the second rotationally moving pivot 216 so as to be capable of moving rotationally, slightly widens the surface area that intercepts the optical path only in the central part 304 in accordance with the shape of the first shading plate 301 in order to completely intercept the rest of the part of the optical path that is intercepted by the first shading plate 301.

The operation of a shutter apparatus 305 structured like the above is entirely the same as the operation of the shutter apparatus of the first embodiment of the present invention and the description is omitted.

According to the second embodiment of the present invention, when the high contrast is instructed, the first shading plate 301 is driven to the position that intercepts a particular part of the optical path and is brought into the high contrast state shown in FIG. 12.

The form of the first shading plate 301 is arranged in the position that substantially conjugates with an entrance pupil of the projection lens 202 in the illumination optical device 203 in order to make the most of the effect of enhancing the contrast.

However, in the case of intercepting the optical path without slightly reducing the surface area that intercepts the optical path only in the central part of the shape of the first shading plate 301, the optical path is intercepted non-rotation-symmetrically relative to an aperture diameter of the optical path of the illumination optical device 203. Thus, a balance of illuminance of the image projected on the screen also become non rotational symmetric, causing the marked deterioration in the illuminance only in a particular angle of view.

On the other hand, according to the shape of the first shading plate 301, an aperture slightly widens only in a vicinity of an optical axis where the illuminance is the highest in the pupil by slightly reducing the surface area that intercepts the optical path only in the central part 302. Thus, even though the problem like the above occurs, it is possible to greatly ease the deterioration in the illuminance only in a particular direction angle of view, without losing the effect of enhancing the contrast considerably.

According to the second embodiment of the present invention, when the image mute state is instructed, the second shading plate 303 slightly widens the surface area that intercepts the optical path only in the central part 304 in accordance with the shape of the first shading plate 301 such that the second shading plate 303 completely shades the optical path by shading the rest of the part of the optical path left after the first shading plate 301 shades the particular part of the optical path. Therefore, it is possible to completely shade the optical path and also completely intercept the image.

Third Embodiment

Figure 14:
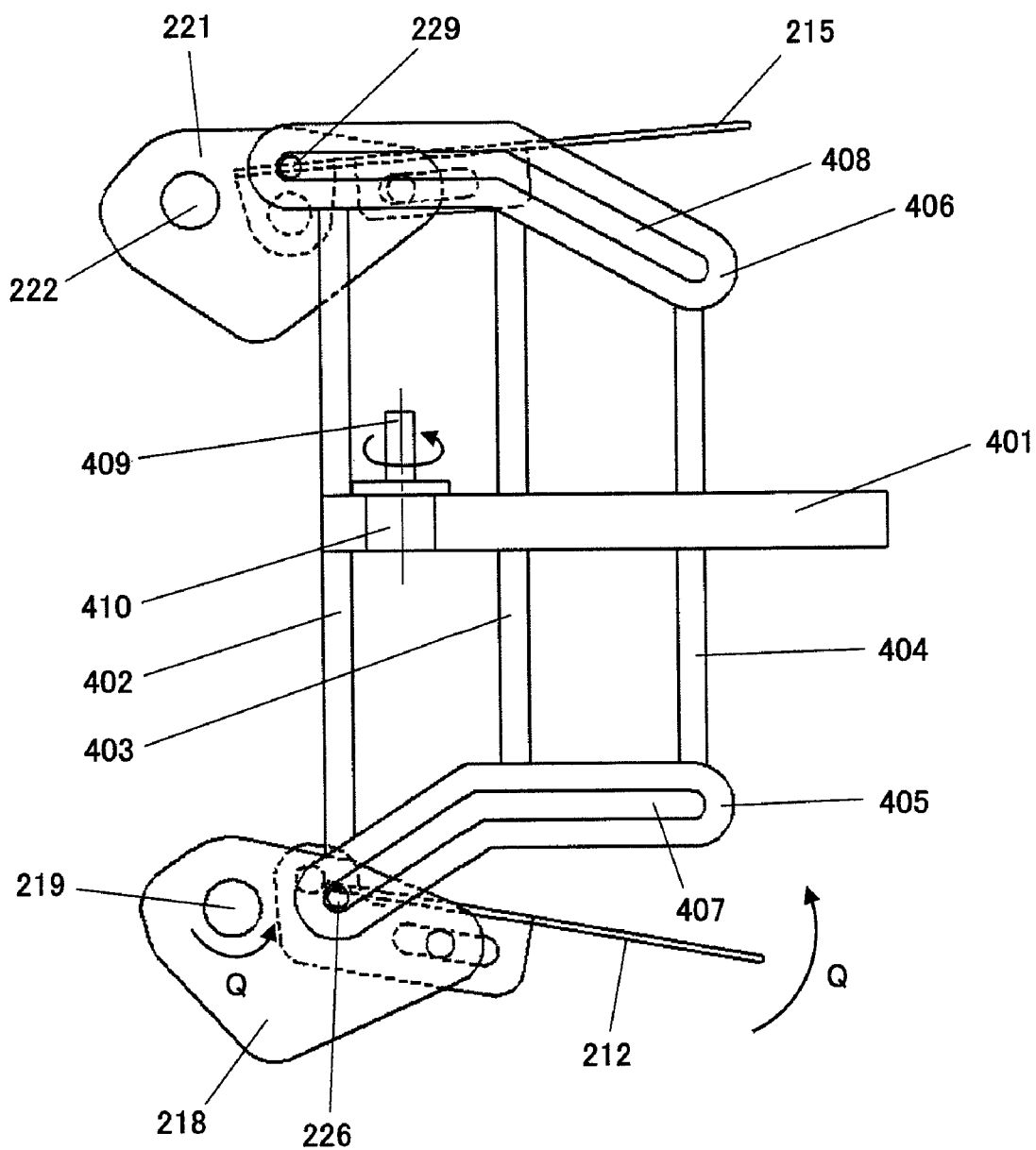
FIG. 14 is a schematic view illustrating a structure of the shutter apparatus of the third embodiment of the present invention in the usual usage state.
Figure 15:
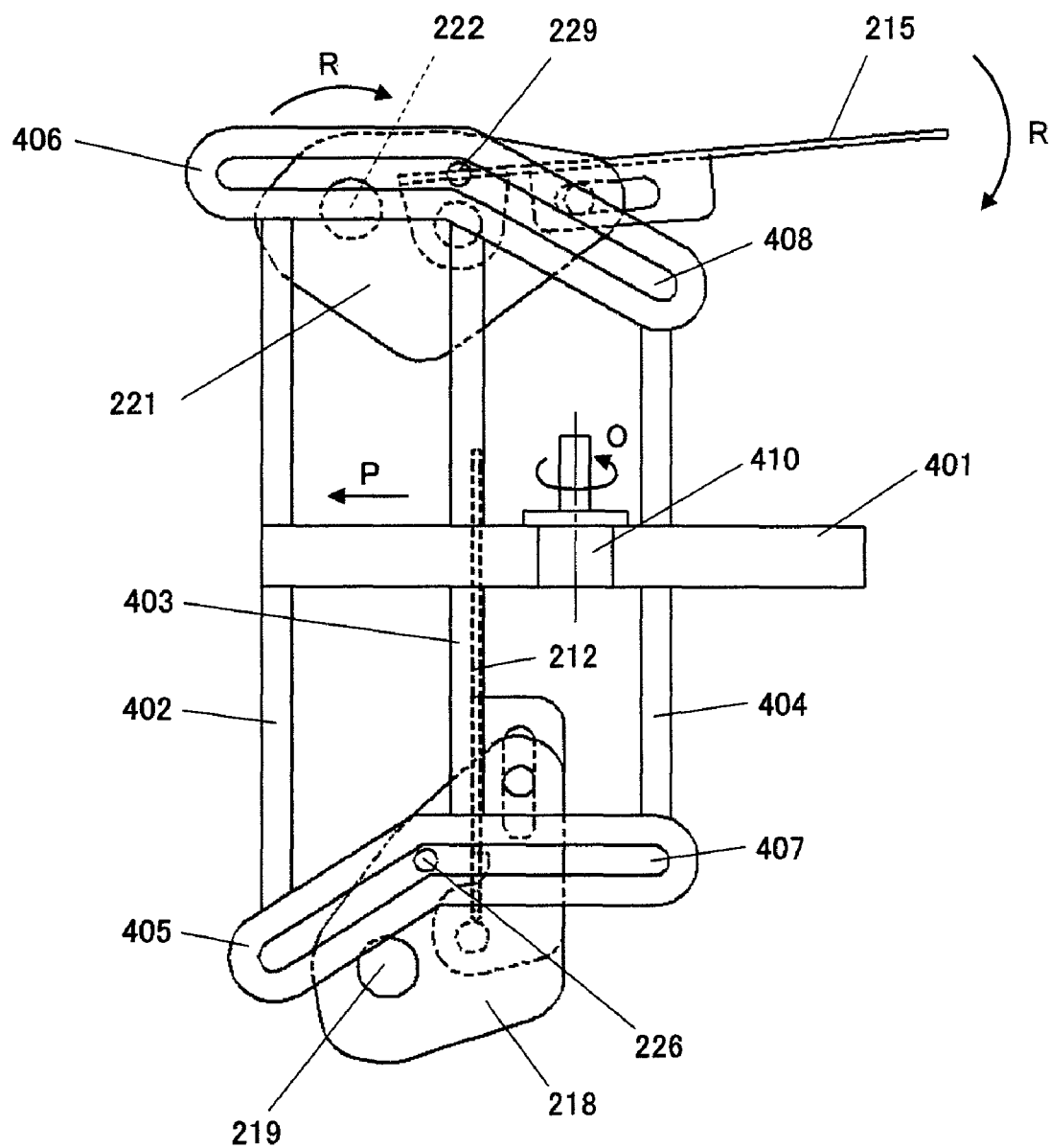
FIG. 15 is a schematic view illustrating a structure of the shutter apparatus of the third embodiment of the present invention in the high contrast state.
Figure 16:
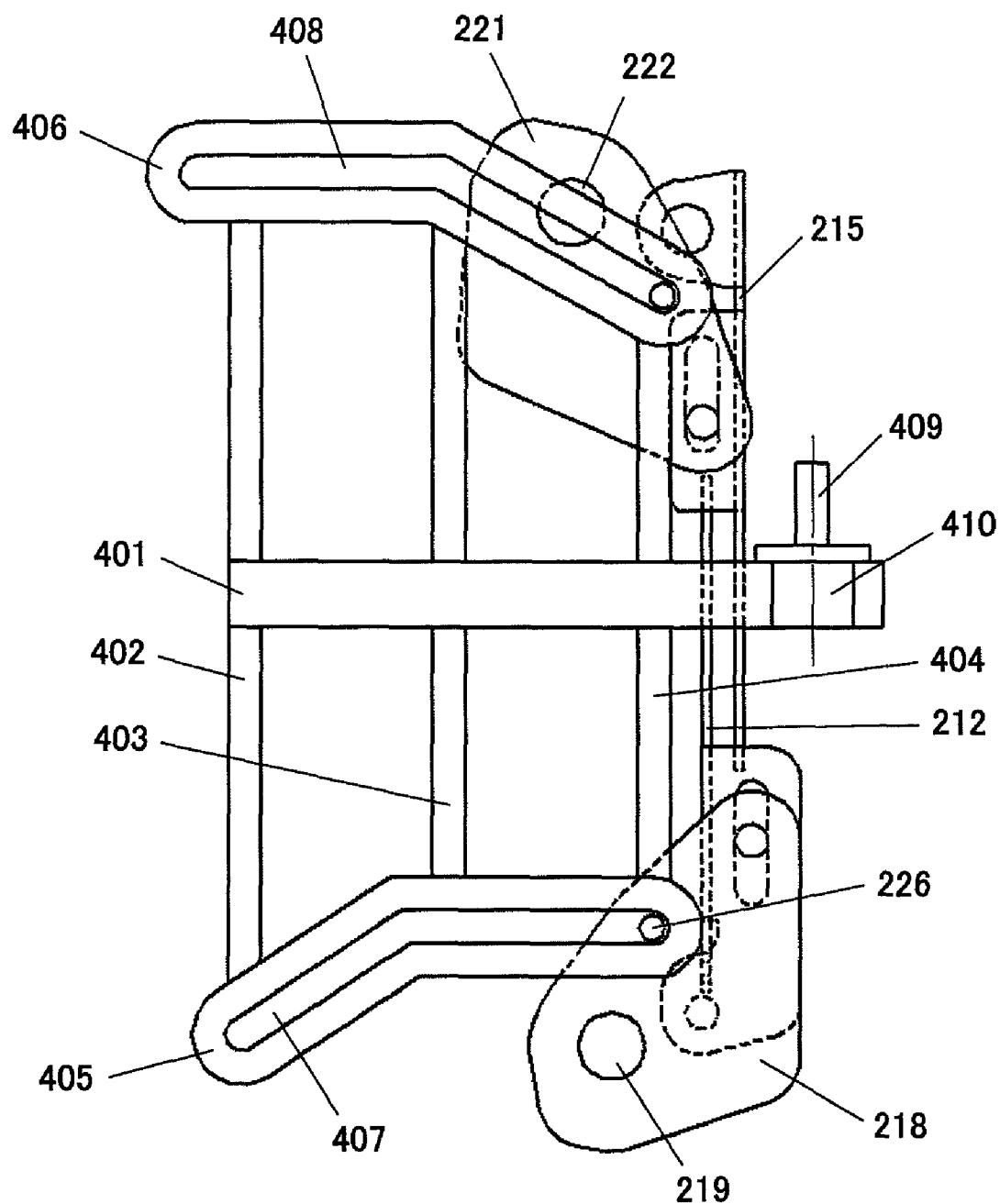
FIG. 16 is a schematic view illustrating a structure of the shutter apparatus of the third embodiment of the present invention in the image mute state.
Figure 17A:
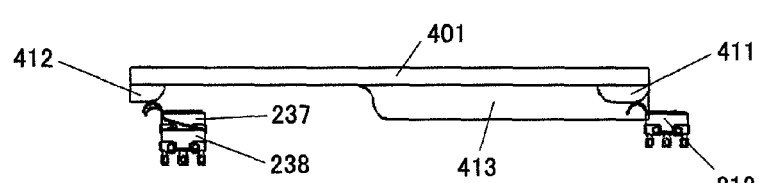
FIG. 17A, FIG. 17B and FIG. 17C are schematic views illustrating positional relation of the position detecting sensors in each state of the shutter apparatus of the third embodiment of the present invention in each state.
Figure 17B:
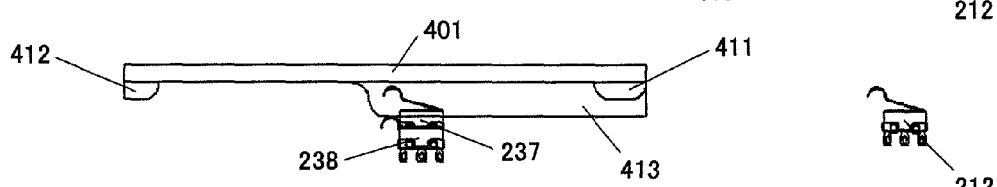
Figure 17C:
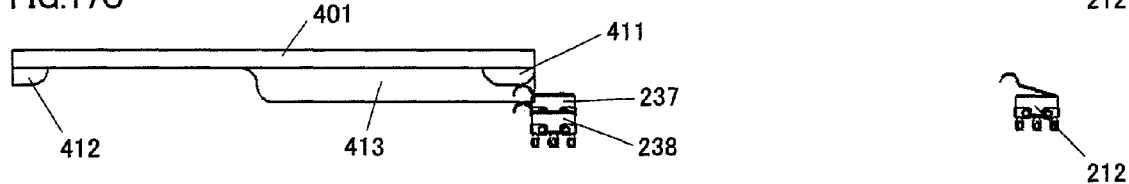
Figure 18:
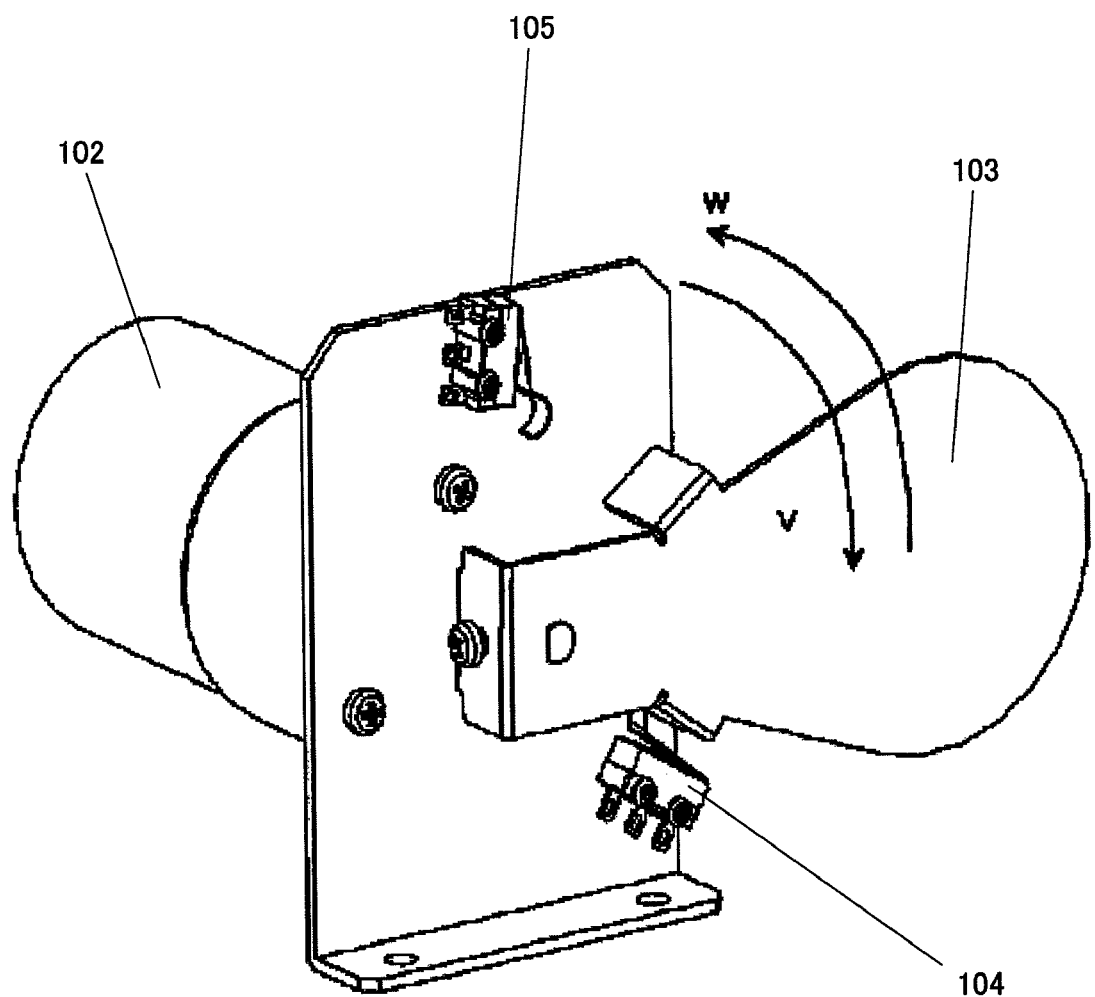
FIG. 18 is a perspective view illustrating a structure of a conventional shutter apparatus for an image interception.
Figure 19:
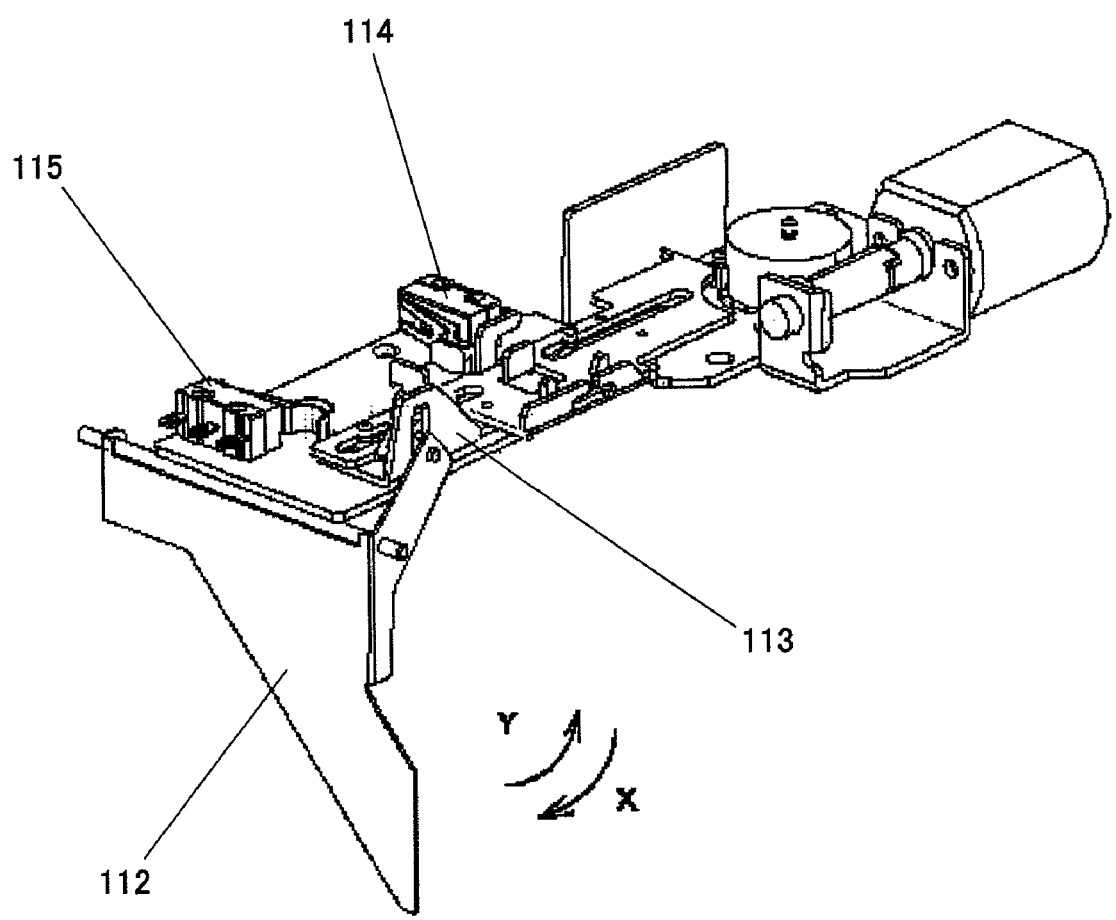
FIG. 19 is a perspective view illustrating a structure of the conventional shutter apparatus for an aperture adjustment.

FIG. 14 is a schematic view illustrating the structure of the shutter apparatus of the third embodiment of the present invention in the usual usage state. FIG. 15 is a schematic view illustrating the same shutter apparatus in the high contrast state. FIG. 16 is a schematic view illustrating the structure of the same shutter apparatus in the image mute state. FIG. 17A, FIG. 17B and FIG. 17C are schematic views illustrating positional relation of the position detecting sensors of the same shutter apparatus in each state.

From FIG. 14 to FIG. 17A, FIG. 17B and FIG. 17C, same references are used for components which are the same as the components in FIG. 1 to FIG. 9 and the descriptions are omitted.

Through FIG. 14 to FIG. 17A, FIG. 17B and FIG. 17C, the first drive lever 218 and the second drive lever 221 are driven to rotationally move by a first guide member 405 and a second guide member 406 which are fixed, via connecting members 402, 403 and 404, to a rack 401 (corresponding to "movable body" in the present invention), the rack 401 being supported so as to be capable of reciprocating along a straight line.

That is the first guide member 405 has a guide groove 407 that engages with the cam pin 226 of the first drive lever 218. Also, a second guide member 406 has a guide groove 408 that engages with the cam pin 229 of the first drive lever 221. Also, the rack 401 moves along the straight line, which changes the engaging position of the cam pin 226 with the guide groove 407 and the engaging position of the cam pin 229 with the guide groove 408. The drive lever 218 and 221 moves rotationally in different operation modes like the first embodiment around the first drive lever pivot 219 and the second drive lever pivot 222.

The rotational movement of a pinion 410, which is fixed to one end of an output shaft 409 of the drive source (illustration omitted), causes the rack 401 to reciprocate along the straight line (reciprocates in a right and left direction in FIG. 14).

The guide grooves 407 and 408 are formed such that the first drive lever 218 and the second drive lever 221 rotationally move mutually independently. That is when the rack 401 performs a straight-line motion, the engaging position of the guide groove 408 with the cam pin 229 of the second drive lever 221 does not change (the second shading plate 215 is not moving rotationally), while the engaging position of the guide groove 407 with the cam pin 226 of the first drive lever 218 is changing (while the first shading plate 212 is moving rotationally). On the other hand, the engaging position of the guide groove 407 with the cam pin 226 of the first drive lever 218 does not change (the first shading plate 212 is not moving rotationally), while the engaging position of the guide groove 408 with the cam pin 229 of the second drive lever 221 is changing (while the second shading plate 215 is moving rotationally).

Thus, in the third embodiment, the timing of the rotational movement of the first shading plate 212 and the timing of the rotational movement of the second shading plate 215 are different from each other, which is structured by changing the shapes of the guide grooves 407 and 408 that are formed in the first and second guide members 405 and 406 respectively.

Also, the rack 401 is provided with a position detecting sensor, which detects that the position of the rack 401 shown in FIG. 17A, FIG. 17B and FIG. 17C has moved to the position of each state such as the usual usage state or the like.

FIG. 17A shows the shutter apparatus of the third embodiment in the usual usage state, FIG. 17 B shows the same shutter apparatus in the high contrast state and FIG. 17 C shows the same shutter apparatus in the image mute state.

In FIGS. 17A, B and C, in a longitudinal direction (straight-line motion direction) of the rack 401, two detecting projection parts 411 and 412 are provided at both ends of the first base arranged parallel to the rack 401. Similarly, a detecting projection part 413 is provided in the range from the central part of the second base arranged parallel to the rack 401 to one of the ends of the second base.

The first base and the second base are not illustrated. However, the first and second bases that extend in the right-left direction in FIG. 14, for example, is provided in a state that leaves space above and below in the lower part of the rack 401.

Also, the arrangement of the first base and the second base is not limited to the above. Therefore, for example, the first base and the second base may be arranged in a state that sandwiches the rack 401 therebetween, leaving some space above and below the rack 401. Also, the projection parts 411, 412 and 413 are different from one another in how much the detecting projection part is prominent in FIG. 17A, FIG. 17B and FIG. 17C. This is for convenience in order to make the description of the positional relation with the position detecting sensors easy.

Three position detecting sensors are provided. Two position detecting sensors 212 and 237 are arranged, as shown in FIG. 17A, in the position that is pressed by the detecting projection parts 411 and 412 in the usual usage state, and one position detecting sensor 238 is arranged, as shown in FIG. 17B, in the position that is pressed by the detecting projection part 413 in the high contrast state. Here, the position detecting sensors are the same as the position detecting sensors described in the first embodiment.

Next, each state is described.

Firstly when the shutter apparatus is in the usual usage state, as shown in FIG. 14, the cam pin 226 of the first drive lever 218 and the cam pin 229 of the second drive lever 221 are positioned at one end (here, at left end) of the corresponding guide grooves 407 and 408.

At this time, the position detecting sensors 212 and 237 are pressed, as shown in FIG. 17A, by the detecting projection parts 411 and 412 and then detects that the rack 401 is in the position shown to be in the usual usage state (this stop position corresponds to "second stop position" in the present invention).

When the high contrast state is instructed while the shutter apparatus is in this usual usage state, the DC motor rotates, in an arrow C direction shown in FIG. 14, the output shaft 409 from the state in FIG. 14. Thus, the rack 401 moves in an arrow P direction via the pinion 410.

Along with this movement of the rack 401, the first base and the second base move in the arrow p direction. Then the detecting projection parts 411 and 412 leave the position detection sensors 212 and 237 (see FIG. 17A, FIG. 17B AND FIG. 17C).

Then, this movement changes the engaging position of the cam pin 226 of the first drive lever 218 with the guide groove 407 of the first guide member 405. Then, the first drive lever 218 rotationally moves around the first drive lever pivot 219 in an arrow Q direction. Similarly, the first shading plate 212 rotationally moves in the Q direction. This rotation of the first shading plate 212 intercepts the optical path. Then the usual usage state changes to the high contrast state shown in FIG. 15.

Thus, if the usual usage state changes to the high contrast state, the position detection sensor 238 is contacted, as shown in FIG. 17B, by the detecting projection part 413 of the second base. Then the movement of the rack 401 is stopped (this stop position is "first stop position" in the present invention). At this time, only the first shading plate 212 moves rotationally. The second shading plate 215 does not move rotationally and is in the second stop position.

When the image mute state is instructed while the shutter apparatus is in this high contrast state, the DC motor further rotates the output shaft 409 from the state shown in FIG. 15 in the arrow direction shown in FIG. 15. Thus, the rack 401 further moves in the arrow P direction.

Along with this movement of the rack, the first base and the second base move in the arrow P direction. At this time, the second detecting projection part 413 of the second base remains pressing the position detecting sensor 238.

Then, due to this movement, the engaging position of the cam pin 229 of the second drive lever 221 with the guide groove 408 of the guide member 406 changes. Then the second drive lever 221 rotationally moves around the drive lever pivot 222 in an arrow R direction and the second shading plate 215 rotationally moves in the arrow R direction, intercepting the optical path. Then the high contrast state changes to the image mute state shown in FIG. 16.

Thus, when the high contrast state changes to the image mute state, the position detecting sensor 237 is pressed, as shown in FIG. 17C, by the detecting projection part 411 of the first base, which stops the movement of the rack 401 (this stop position is "the first stop position" in the present invention).

Thus, it is possible to use the straight line motion mechanism in order to allow the shading plates 212 and 215 to be driven to move rotationally. Also, in this case, space necessary for arranging the straight line motion mechanism may possibly be larger, compared to the case of using the cammed gear, which is a rotationally moving mechanism. However, compared to the cammed gear whose parts must be formed by resin material and aluminum die casting, it is possible for parts of the straight line motion mechanism to be formed from sheet metal material. Therefore, there is an effect of reducing the cost of dies of parts.

MODIFICATIONS

Hereinbefore, although the present invention is described based on the embodiments, it is apparent that the content of the present invention is not limited to the above specific examples shown in the first to third embodiments. Therefore, for example, the modifications like the following may be implemented.

1. Number of Shading Plates

Although the shutter apparatuses in the first to third embodiments have two shading plates, the shutter apparatus of the present invention may have three or more shading plates. Even when the shutter apparatus of the present invention has three or more shading plates, it is possible to make the space for rotational movement of the shading plates smaller by structuring the shutter apparatus such that the distance from the rotationally moving shaft of the shading plate to the edge of the shading plate (radius of rotational movement of the shading plate) is smaller than the diameter of the cross section of the optical path.

Also, in using three or more shading plates, for example, the rotationally moving shafts of the shading plates may be arranged so as to surround the optical path at the cross section of the optical path.

2. Modes

In the above embodiments, the operation mode of the first shading plate is the aperture adjustment mode and the operation mode of the second shading plate is the mute mode. Also, the shape of the guide groove is structured arbitrarily so as not to rotationally move the first shading plate and the second shading plate with the same timing. However, the operation mode of the present invention is not limited to the case where only one shading plate, of a plurality of the shading plates, moves rotationally.

For example, of three shading plates, two shading plates may be operated in the aperture adjustment mode and the other one may be operated in the mute mode. In this case, two shading plates in the aperture adjustment mode may be moved rotationally at the same time.

On the other hand, one shading plate may be rotationally moved in the aperture adjustment mode and the other two may be operated in the mute mode. In this case, two shading plates in the mute mode may rotationally move at the same time.

The operation modes described in the above embodiments and the modifications are two types: the mute mode and the aperture adjustment mode. However, operation mode may be structured such that the mute mode and the aperture adjustment mode become one mode by setting the rotational movement of the plurality of the shading plates arbitrarily so as to make rotationally moving operations of the shading plates different from one another. In this case, the different operation modes mean different operations of the shading plates. Also, examples of these include the case of rotationally moving a plurality of the shading plates at different rotationally moving speed and the case of changing the timing of starting to rotationally move the plurality of the shading plates.

3. Power Transmission Mechanism

The power transmission mechanism of the first embodiment includes the cammed gear, cam groove and drive lever. Here, the cammed gear that performs reciprocating rotational movement by drive from the drive source. The cam groove is formed on the side of the cammed gear. The drive lever has the pin that engages with the cammed groove and rotates around a predetermined shaft. The rotational movement of the cammed gear changes the engaging position of the drive lever with the cam groove. Then the drive lever transmits the rotationally moving force (drive force) indirectly to the shading plates via the pin of the drive lever.

On the other hand, the power transmission mechanism of the third embodiment has the rack, guide member and drive lever. Here, the rack reciprocates along the straight line by driving force from the drive source. The guide member is mounted on the rack and has the guide groove. The drive lever has the pin that engages with the guide groove and moves rotationally around a predetermined shaft. Also, the rotational movement of the rack changes the engaging position of the drive lever with the cam groove. Then the drive lever indirectly transmits the rotationally moving force to the shading plate via the pin of the drive lever.

However, the power transmission mechanism pertaining to the present embodiment does not necessarily need the above drive lever. Therefore, the drive force of the cammed gear or the rack may be directly transmitted to the shading plates by providing the shading plates with the pins engaging with the cam groove of the cammed gear or the guide groove of the guide member mounted on the rack.

Also, in transmitting the driving force to the shading plates via the drive lever, it is needless to say that the pins of the shading plates may be structured so as to engage with the guide groove of the drive lever (the pins of the dive lever engages with the long groove (guide groove) of the shading plates in the embodiment).

4. Position Detecting Switch

According to the first embodiment of the present invention, although the micro switch is used as the position detecting sensors 237, 238 and 239, these position detecting sensors are not limited to the point-contact type. Therefore, a method or the like that detects by a photointerpreter or by a sensor using a reflection type light-receiving element is possible. Also, it is possible to control movement by the number of steps of motors, using the DC motor 235 (drive source) as a stepping motor, without using the position detecting sensor. Also, the method of providing a detection mechanism capable of counting the number of rotational movements of the drive member such as a potentiometer, is possible. Also, it is possible to control movement in other positions by measuring time needed during the operation with the number of detecting sensors reduced to one.

INDUSTRIAL APPLICABILITY

The shutter apparatus and the drive method pertaining to the present invention are capable of selectively driving the plurality of the shading plates using one drive source, which makes it possible to arbitrarily operate a plurality of functions that accompany the movement of each shading plate. As a result, it is possible to compose a shutter apparatus that is highly space-saving, small in the number of parts and multi-functional. Thus, it is possible to downsize and lighten the weight of the shutter apparatus and reduce cost, which makes the present invention useful for a shutter apparatus used for a projection display apparatus for both an image interception and an aperture adjustment, a drive method for the same and the like.

The invention claimed is:

1. A shutter apparatus for intercepting an optical path, the shutter apparatus comprising:
    a plurality of shading plates each being pivotally supported by a corresponding one of a plurality of rotationally moving shafts so as to be capable of moving rotationally, an extending direction of the rotationally moving shafts being substantially orthogonal to the optical path;
    one drive source; and
    a power transmission mechanism that transmits driving force of the drive source to each of the shading plates such that each of the shading plates rotationally moves in different operation modes between a first stop position where each shading plate intercepts the optical path the most and a second stop position where each shading plate intercepts the optical path the least, wherein
    the optical path is substantially completely intercepted when all of the plurality of the shading plates are in the first stop position.

2. The shutter apparatus of claim 1, wherein
    a radius of rotational movement of each shading plate is smaller than a diameter of the optical path.

3. The shutter apparatus of claim 2, wherein
    each of the plurality of the shading plates includes one of a pin and a guide, wherein
    the power transmission mechanism includes (i) one of a guide and a pin that engages with the one of the pin and the guide respectively of each shading plate and (ii) one or a plurality of movable bodies that reciprocate by the driving force of the drive source, and transmits the driving force by a change in an engaging position with the shading plates, the change being caused by reciprocating motion of the movable bodies.

4. The shutter apparatus of claim 3, wherein
    the movable bodies are a plurality of gears provided corresponding to each of the shading plates, and
    the guide of the power transmission mechanism is a cam-shaped guide groove, which is formed on a side of each gear and corresponds to each operation mode.

5. The shutter apparatus of claim 4, wherein
    the plurality of the gears are coupled to each other and transmit the driving force of the drive source from one gear to another gear.

6. The shutter apparatus of claim 1, wherein
    each of the plurality of the shading plates includes one of a pin and a guide, wherein
    the power transmission mechanism includes (i) one of a guide and a pin that engages with the one of the pin and the guide respectively of each shading plate and (ii) one or a plurality of movable bodies that reciprocate by the driving force of the drive source, and transmits the driving force by a change in an engaging position with the shading plates that form a variable opening of the shutter apparatus, the change being caused by reciprocating motion of the movable bodies.

7. The shutter apparatus of claim 5, wherein
a number of the plurality of the shading plates is two, and
a surface area of each shading plate is substantially equal to a surface area of a cross sectional surface area divided in two of the optical path.

8. The shutter apparatus of claim 6, wherein
a number of the plurality of the shading plates is two, and
a surface area of each shading plate is substantially equal to a surface area of a cross sectional surface area divided in two of the optical path.

9. The shutter apparatus of claim 6, wherein
the movable bodies reciprocate in a straight line and are provided with the guide corresponding to each shading plate.

10. The shutter apparatus of claim 1, wherein
a number of the plurality of the shading plates is two, and
a surface area of each shading plate is substantially equal to a surface area of a cross sectional surface area divided in two of the optical path.

11. A drive method for a shutter apparatus for intercepting an optical path, the shutter apparatus transmitting a driving force from one drive source by a power transmission mechanism so as to rotationally move a plurality of shading plates between a first stop position where the shading plates intercept the optical path the most and a second stop position where the shading plates intercept the optical path the least, the shading plates being pivotally supported by a plurality of rotationally moving shafts so as to be capable of rotationally moving, an extending direction of the rotationally moving shafts being substantially orthogonal to the optical path, wherein
the power transmission mechanism rotationally moves the plurality of the shading plates in different operation modes.

12. The drive method of claim 11, wherein
each of the plurality of the shading plates includes one of a pin and a guide, wherein
the power transmission mechanism includes (i) one of a guide and a pin that engages with the one of the pin and the guide respectively of each shading plate and (ii) one or a plurality of movable bodies that reciprocate by the driving force of the drive source, and transmits the driving force by a change in an engaging position with the shading plates, the change being caused by reciprocating motion of the movable bodies.

13. The drive method of claim 12, wherein
the movable bodies are a plurality of gears provided corresponding to each of the shading plates, and the guide of the power transmission mechanism is a cam-shaped guide groove, which is formed on a side of each gear and corresponds to each operation mode.

14. The drive method of claim 13, wherein
the plurality of the gears are coupled to each other and transmit the driving force of the drive source from one gear to another gear.

15. The drive method of claim 14, wherein
a number of the plurality of the shading plates is two, and
a surface area of each shading plate is substantially equal to a surface area of a cross sectional surface area divided in two of the optical path.

16. The drive method of claim 12, wherein
the movable bodies reciprocate in a straight line and are provided with the guide corresponding to each shading plate.

17. The drive method of claim 16, wherein
a number of the plurality of the shading plates is two, and
a surface area of each shading plate is substantially equal to a surface area of a cross sectional surface area divided in two of the optical path.

18. The drive method of claim 11, wherein
a number of the plurality of the shading plates is two, and
a surface area of each shading plate is substantially equal to a surface area of a cross sectional surface area divided in two of the optical path.

19. A shutter apparatus comprising:
a plurality of rotationally moving shafts each capable of moving rotationally and being orthogonal to an optical path;
a plurality of shading plates of the shutter apparatus, each provided on one of the rotationally moving shafts and moving rotationally through rotation of the rotationally moving shafts to enable an opening for the optical path;
one drive source producing a driving force; and
a power transmission mechanism that transmits the driving force of the drive source to the plurality of rotationally moving shafts to enable at least three aperture positions for the sliding plates,
wherein a first position enables each shading plate to intercept the optical path to provide a closed position to block transmission of light, a second position where the shading plates are positioned to provide a minimal interception of the optical path or removal from the optical path, and a third position where at least one of the shading plates intercepts the optical path to provide high contrast while the remaining shading plates or plate is removed from the optical path.

* * * * *